(12) United States Patent
Kim et al.

(10) Patent No.: US 11,990,080 B2
(45) Date of Patent: May 21, 2024

(54) ELECTRONIC DEVICE AND METHOD FOR CONTROLLING DISPLAY THEREOF

(71) Applicant: SAMSUNG ELECTRONICS CO., LTD., Suwon-si (KR)

(72) Inventors: Hojin Kim, Suwon-si (KR); Donghyun Yeom, Suwon-si (KR); Jaehun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/091,155

(22) Filed: Dec. 29, 2022

(65) Prior Publication Data

US 2023/0222957 A1 Jul. 13, 2023

Related U.S. Application Data

(63) Continuation of application No. PCT/KR2022/021038, filed on Dec. 22, 2022.

(30) Foreign Application Priority Data

Jan. 7, 2022 (KR) .......................... 10-2022-0002801

(51) Int. Cl.
*G06F 9/50* (2006.01)
*G06F 9/48* (2006.01)
(Continued)

(52) U.S. Cl.
CPC ... *G09G 3/2092* (2013.01); *G09G 2340/0407* (2013.01); *G09G 2354/00* (2013.01); *G09G 2380/02* (2013.01)

(58) Field of Classification Search
CPC .............................................. G09G 2340/0407
See application file for complete search history.

(56) References Cited

U.S. PATENT DOCUMENTS 9,262,059 B2   2/2016   Kim et al.
9,495,881 B2   11/2016  Christmas et al.
(Continued)

FOREIGN PATENT DOCUMENTS

JP   2019-512749    5/2019
KR   2007-0097383   10/2007
(Continued)

OTHER PUBLICATIONS

Search Report and Written Opinion dated Dec. 22, 2022 issued in International Patent Application No. PCT/KR2022/021038.

*Primary Examiner* — Nan-Ying Yang
(74) *Attorney, Agent, or Firm* — NIXON & VANDERHYE P.C.

(57) ABSTRACT

An electronic device includes: a display panel, a display driving circuit, and at least one processor operatively connected to the display driving circuit. The at least one processor may be configured to: determine a resolution of each of a plurality of applications, and generate a frame image including regions corresponding to execution screens of the plurality of applications and determined resolutions of the plurality of applications, based at least partially on the resolutions of the plurality of applications and/or information on a display region corresponding to the execution screens of the plurality of applications on the display panel, and transmit, to the display driving circuit, the frame image and coordinate information of each of the regions included in the frame image. The display driving circuit up-scales at least a portion, which has resolution lower than resolution of the display panel, of the regions included in the frame image, based on the frame image and the coordinate information of each of the regions, such that the frame image has resolution corresponding to the resolution of the display panel and control the display panel to display the execution screen of (Continued)

each of the plurality of applications, based on the up-scaled frame image.

17 Claims, 21 Drawing Sheets

(51) Int. Cl.
*G09G 3/20* (2006.01)
*G09G 5/10* (2006.01)

(56) References Cited

U.S. PATENT DOCUMENTS

| | | | |
|---|---|---|---|
| 9,940,013 B2 | 4/2018 | Choi et al. | |
| 10,304,419 B2 | 5/2019 | Park et al. | |
| 10,310,730 B2 | 6/2019 | Choi et al. | |
| 10,437,422 B2 | 10/2019 | Zatalovski | |
| 10,490,165 B2 | 11/2019 | Kim et al. | |
| 10,692,472 B2 | 6/2020 | Chae et al. | |
| 2016/0124536 A1* | 5/2016 | Hyun | G06F 3/0487 345/173 |
| 2016/0247437 A1* | 8/2016 | Choi | G09G 3/2003 |
| 2019/0130875 A1 | 5/2019 | Zhong et al. | |
| 2021/0124625 A1* | 4/2021 | Noh | G06F 9/48 |

FOREIGN PATENT DOCUMENTS

| | | |
|---|---|---|
| KR | 10-0846807 | 7/2008 |
| KR | 10-1525160 | 2/2010 |
| KR | 10-2012-0117107 | 10/2012 |
| KR | 10-2014-0073445 | 6/2014 |
| KR | 10-1592885 | 2/2016 |
| KR | 2017-0019615 | 2/2017 |
| KR | 10-1718046 | 3/2017 |
| KR | 10-2018-0014494 | 2/2018 |
| KR | 2020-0044144 | 4/2020 |
| KR | 10-2262220 | 6/2021 |
| WO | 2014/181318 | 11/2014 |

* cited by examiner

ELECTRONIC DEVICE AND METHOD FOR CONTROLLING DISPLAY THEREOF

CROSS-REFERENCE TO RELATED APPLICATIONS

This application is a continuation of International Application No. PCT/KR2022/021038 designating the United States, filed on Dec. 22, 2022, in the Korean Intellectual Property Receiving Office and claiming priority to Korean Patent Application No. 10-2022-0002801, filed on Jan. 7, 2022, in the Korean Intellectual Property Office, the disclosures of which are incorporated by reference herein in their entireties.

BACKGROUND

Field

The disclosure relates to a technology for controlling a display to output a screen.

Description of Related Art

Recently, electronic devices having a large screen display have been widely distributed. For example, electronic devices including flexible displays (foldable displays, rollable displays, or stretchable displays) have been extensively spread. For example, as the size of the display included in the electronic device is increased, the electronic device may provide a plurality of contents within one display. For example, the electronic device may simultaneously display execution screens of a plurality of applications or provide multiple window screens.

When the electronic device provides a plurality of execution screens in the display, the execution screens need to be improved in image quality and visibility.

SUMMARY

Embodiments of the disclosure provide an electronic device, capable of providing a display output having a higher resolution while reducing power consumption by at least partially up-scaling a frame image, and a method for providing a display of the electronic device.

According to an example embodiment of the disclosure, an electronic device may include: a display panel, a display driving circuit, and at least one processor operatively connected to the display driving circuit. The at least one processor may be configured to: determine a resolution of each of a plurality of applications, and generate a frame image including regions corresponding to execution screens of the plurality of applications and determined resolutions of the plurality of applications, based at least partially on the resolutions of the plurality of applications and/or information on a display region corresponding to the execution screens of the plurality of applications on the display panel, and transmit, to the display driving circuit, the frame image and coordinate information of each of the regions included in the frame image. The display driving circuit may be configured to: up-scale at least a portion, having a resolution lower than a resolution of the display panel, of the regions included in the frame image, based on the frame image and the coordinate information of each of the regions, such that the frame image has resolution corresponding to the resolution of the display panel and control the display panel to display the execution screen of each of the plurality of applications, based on the up-scaled frame image.

According to an example embodiment of the disclosure, a method for controlling a display of an electronic device, may include: determining a resolution of each of a plurality of applications, generating a frame image including regions corresponding to execution screens of the plurality of applications and determined resolutions of the plurality applications, based at least partially on the resolutions of the plurality of applications and/or information on a display region corresponding to the execution screen of each of the plurality of applications on a display, up-scaling at least a portion, having a resolution lower than a resolution of the display, of the regions included in the frame image, based on the frame image and coordinate information of each of the regions included in the frame image, such that the frame image has resolution corresponding to the resolution of the display, and displaying, on the display, the execution screen of each of the plurality of applications, based on the up-scaled frame image.

According to various example embodiments of the disclosure, the frame image is at least partially up-scaled and provided to the display, thereby reducing power consumption while compensating for and improving the image quality of the screen output to the display.

According to various example embodiments of the disclosure, when execution screens of a plurality of applications are displayed, frame images corresponding to the execution screens are at least partially up-scaled, based on the characteristics (types) of the applications, the display position of the execution screens, or the sizes of the execution screens, a user input, or the execution history of the applications According to various example embodiments of the disclosure, the frame image produced by the processor may be provided to the DDI, and the DDI at least partially up-scales the frame image and provides the up-scaled frame image to the display.

Besides, a variety of effects directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In the following description made with respect to the accompanying drawings, similar components will be assigned with similar reference numerals.

DETAILED DESCRIPTION

Figure 1:
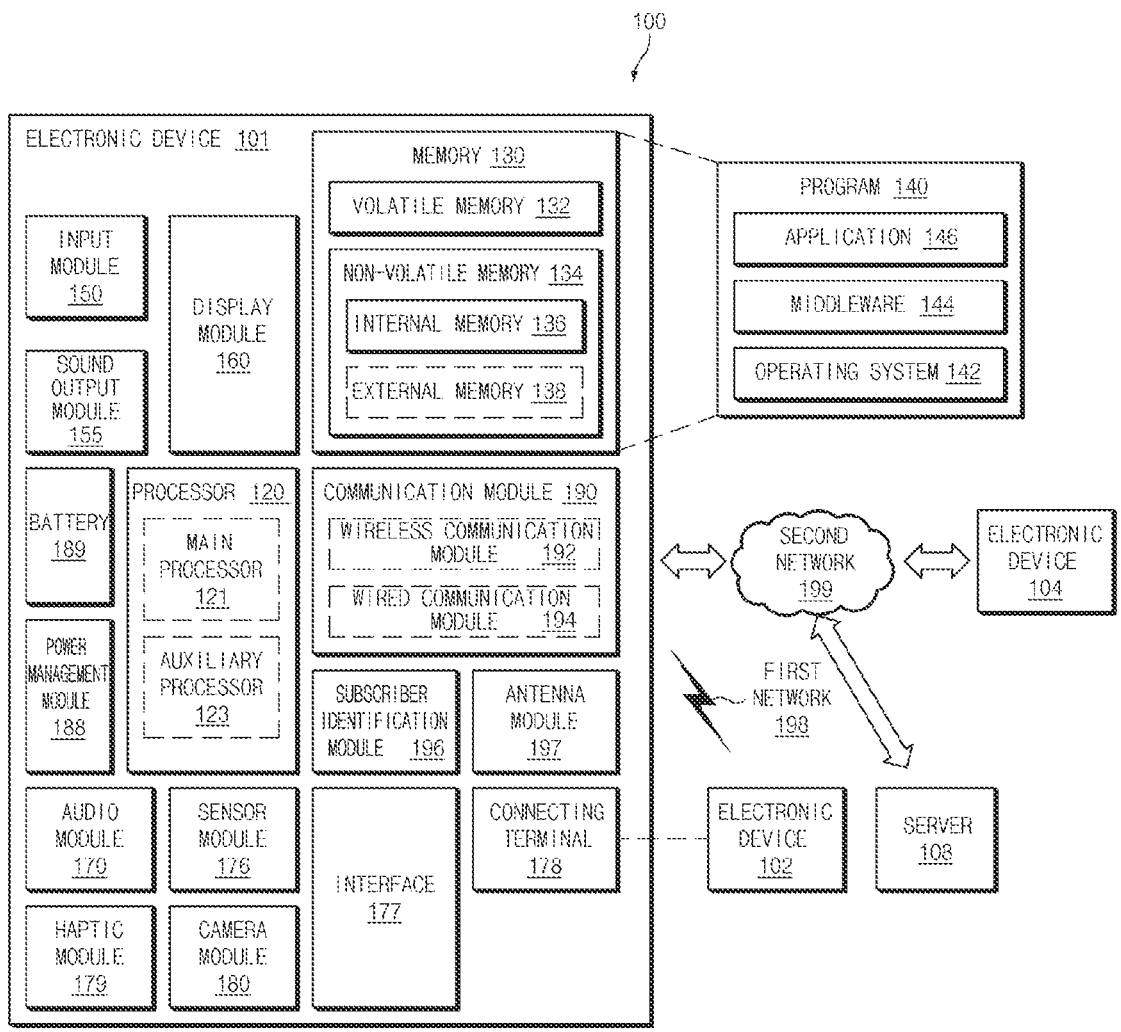
FIG. 1 is a block diagram illustrating an example electronic device 101 in a network environment 100 according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
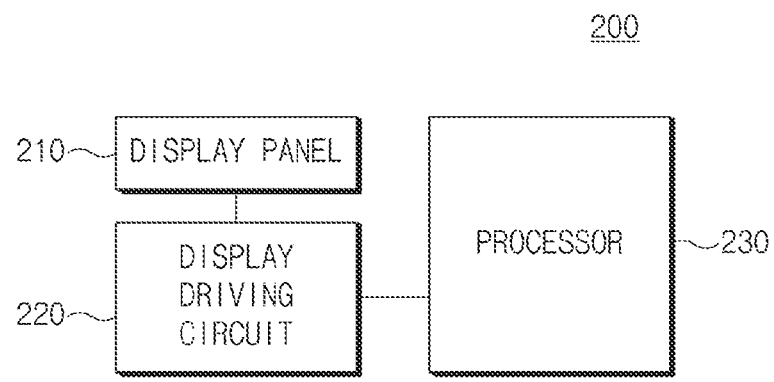
FIG. 2 is a block diagram illustrating an example configuration of an electronic device, according to various embodiments.

FIG. 2 is a block diagram illustrating an example configuration of an electronic device, according to various embodiments.

According to an embodiment, an electronic device 200 (e.g., the electronic device 101 in FIG. 1) may include a display panel 210, a driving circuit (display driving circuit) 220 of a display 210, and a processor (e.g., including processing circuitry) 230 (e.g., the processor 120 in FIG. 1).

According to an embodiment, the display panel 210 may display visual information. For example, the display panel 210 may display an execution screen of at least one application (e.g., application 146 in FIG. 1), based on a frame image (e.g., at least partially up-scaled frame image) under the control of the display driving circuit 220. According to an embodiment, the display panel 210 may include a flexible display panel capable of expanding or contracting a region (screen display region) for displaying a screen. For example, the flexible display panel may include a slidable display panel or a foldable display panel.

According to an embodiment, the display driving circuit 220 may control the display panel 210. For example, the display driving circuit 220 may include a display driving integrated circuit (DDI). According to an embodiment, the display panel 210 and the display driving circuit 220 may include a display (e.g., the display 160 of FIG. 1).

According to an embodiment, the display driving circuit 220 may include a scaler (e.g., including various circuitry and/or executable program instructions) configured to up-scale at least a portion of the frame image. According to an embodiment, the display driving circuit 220 may receive, from the processor 230, a frame image including regions corresponding to the execution screens of the plurality of applications, information on the size of the frame image, and/or information (coordinate information) on coordinates of each region in the frame image. For example, the information on the size of the frame image may be information on the size of a region (a screen display region) for displaying the screen of the display panel 210. For example, the information on the size of the frame image may include coordinate information of the frame image. For example, the information on the size of the frame image may include information on whole coordinates of the display panel 210. For another example, when the display panel 210 forms a flexible display (e.g., a stretchable display), information on the size of the frame image may include information indicating the size of the screen display region changed depending on the state of the flexible display (e.g., when the screen display region is changed, as the shape of the flexible display is changed). For example, each piece of coordinate information may include information on starting coordinates and information on ending coordinates. For example, the display driving circuit 220 may determine whether to up-scale each region in the frame image, based on information on the size of the frame image and/or the coordinate information of each region in the frame image. For example, the display driving circuit 220 may determine whether to up-scale a region corresponding to each execution screen, based on whether adjacent regions corresponding to the execution screens has the same coordinate information or coordinate information about a reference value, or based on whether the regions corresponding to the execution screens are the same or adjacent to each other, and based on the information on the size of the frame image. Hereinafter, an example operation of determining whether to perform an up-scaling operation based on the coordinate information according to various embodiments will be described in greater detail below with reference to FIGS. 10A and 10B. For example, the display driving circuit 220 may up-scale at least partially the frame image (e.g., at least a portion of the region, which corresponds to the execution screen, included in the frame image), based on information on the size of the frame image and/or coordinate information corresponding to the execution screen of the application in the frame image. For example, the display driving circuit 220 may up-scale at least some, which have resolutions lower than the resolution of the display panel 210, of regions included in the frame image, such that the frame image has resolution corresponding to the resolution of the display panel 210.

According to an embodiment, the display driving circuit 220 may control the display panel 210 to display the execution screen of the application, based at least partially on the up-scaled frame image. For example, the display driving circuit 220 may control the display panel 210 to display the execution screen of the application with the resolution (a resolution value corresponding to the resolution of the display panel 210) of the display panel 210, based on the up-scaled frame image.

According to an embodiment, the processor 230 may include various processing circuitry and determine the resolution of each of a plurality of applications, based on the relevant type of the plurality of applications. For example, the resolution of an application may refer to the resolution of a region corresponding to the execution screen of the application included in the frame image, when an initial frame image is generated, or the resolution of the region corresponding to the execution screen of the application included in the frame image before the frame image is partially up-scaled. For example, the resolution of each application may be less than or equal to the resolution of the display panel 210. For example, the processor 230 may determine the resolution of at least one application to be lower than the resolution of the display panel 210. For example, the electronic device 200 may determine the resolution for the application to a specified higher resolution or a specified lower resolution. For example, the specified higher resolution may refer to resolution which does not require up-scaling, and the specified lower resolution may refer to resolution which requires up-scaling. For example, the specified higher resolution may refer to resolution greater than or equal to the resolution of the display panel 210, and the specified lower resolution may refer to the resolution less than the resolution of the display panel 210. For example, although the resolution has been described in two cases of higher resolution and lower resolution for the convenience of explanation, the disclosure is not limited thereto. The resolution for the application may be set to at least two resolutions. For example, a resolution value greater than or equal to the reference resolution value (e.g., the resolution of the display panel 210) for determining whether up-scaling is required, may be included in the higher resolution, and a resolution value less than the reference resolution value may be included in the lower resolution. For example, the processor 230 may determine, to the higher resolution, the resolution of an application, which needs to be displayed on the display panel 210 with the higher image quality, in which the application includes an application (e.g., a document application) in a type requiring higher readability due to a large number of texts provided in an execution screen, or an application (e.g., a gallery application, a video application, and an SNS application) in a type requiring higher visibility. For example, the processor 230 may determine, to the lower resolution, the resolution of an application in a type, in which image quality (resolution) displayed on the display panel 210 is relatively less important (e.g., a health application, a financial or bank application, a navigation application, and a music applications). For example, when determining the resolution of a high-performance application (e.g., a high-performance game application) to the higher resolution, the processor 230 may determine the resolution of the high-performance application to the lower resolution if necessary, because the multi-tasking may not be smoothly performed due to insufficient resources of the electronic device 200 when multi-tasking the plurality of applications. For example, the processor 230 may determine the resolution of each application, based on at least a portion of a region, which is occupied by the execution screen of each application, in the entire screen display region of the display panel 210. For example, when the region for displaying the execution screen of an application occupies at a specified proportion (e.g., 50%) of the entire screen display region, the processor 230 may determine the resolution for the application to the higher resolution. For example, the specified proportion may be set (or specified) to various values. For example, the processor 230 may provide a user interface for setting the resolution of an application, which is being executed, or an application to be executed, and may determine the resolution for the application based on the input received through the user interface. For example, the processor 230 may determine the resolution for the application based on the resolution information set when the application was previously executed. For example, data related to the application (e.g., manifest of the application) may contain resolution information set when the application is previously executed. For example, the processor 230 may determine the resolution of an application, based on the information stored in the manifest of an application. According to an embodiment, the processor 230 may determine the resolution for the application in response to a user input for providing a multi-window screen including execution screens of a plurality of applications. For example, the user input may include a user input for additionally executing another application while executing one application.

According to an embodiment, the processor 230 may generate a frame image including regions corresponding to execution screens of the plurality of applications and the determined resolution (the resolution of an application), based on the resolution of each of the plurality of applications and/or information on a display region corresponding to the execution screen of each application. For example, the processor 230 may generate a frame image at a scanning rate (e.g., 60 per second) of the display panel 210. For example, the frame image may correspond to the entire screen display region to be displayed on the display panel 210. For example, the processor 230 may generate the frame image such that a region corresponding to the execution screen of the application determined to have the higher resolution corresponds to the size and/or resolution of the execution screen to be displayed on the actual display panel 210. For example, the region corresponding to the execution screen of the application determined to have the higher resolution in the frame image may have resolution greater than or equal to the resolution of the display panel 210. For example, the processor 230 may generate the frame image such that the region corresponding to the execution screen of the application determined to have the higher resolution has a size, which is smaller than the size of an execution screen to be actually displayed on the display panel 210, or has resolution, which is lower than the resolution of the execution screen to be actually displayed on the display panel 210. For example, a region corresponding to an execution screen of an application determined to have the lower resolution in the frame image may have the resolution lower than the resolution of the display panel 210. For example, the processor 230 may generate frame images including regions corresponding to execution screens of a plurality of applications by generating (drawing) images corresponding to the execution screens of the plurality of applications, merging the images, or compositing the images. For example, the processor 230 may at least temporarily store the frame image in a frame buffer. According to an embodiment, the processor 230 may recognize information on the size of the frame image and coordinate information of a region corresponding to the execution screen of each application included in the frame image. According to an embodiment, the processor 230 may transmit at least some of the frame image stored in the frame buffer, information on the size of the frame image, and/or coordinate information of each region included in the frame image, to the display driving circuit 220.

According to an embodiment, the electronic device 200 may further include at least some of components of the electronic device 101 illustrated in FIG. 1.

According to an embodiment, the electronic device 200 may selectively adjust the resolution for the application by at least partially up-scaling the frame image, instead of collectively up-scaling the frame image. Accordingly, the electronic device 200 generates an image, which corresponds to an execution screen of an application requiring a higher resolution, to have a higher resolution, based on the type of the application or a region for displaying the execution screen, instead of generating images, which correspond to execution screens of the all applications, to have a higher resolution, and generates an image corresponding to the execution screen of an application, which does not require the higher resolution to have a lower resolution (e.g., resolution less than resolution of the display panel 210), and then at least partially up-scales the image. Accordingly, the electronic device 200 may control the display panel 210 with lower power consumption than that of the case that all frame images have the higher resolution while improving the quality (resolution) of the screen displayed on the display panel 210, as compared with the case that the all frame images having the lower resolution are generated.

Figure 3:
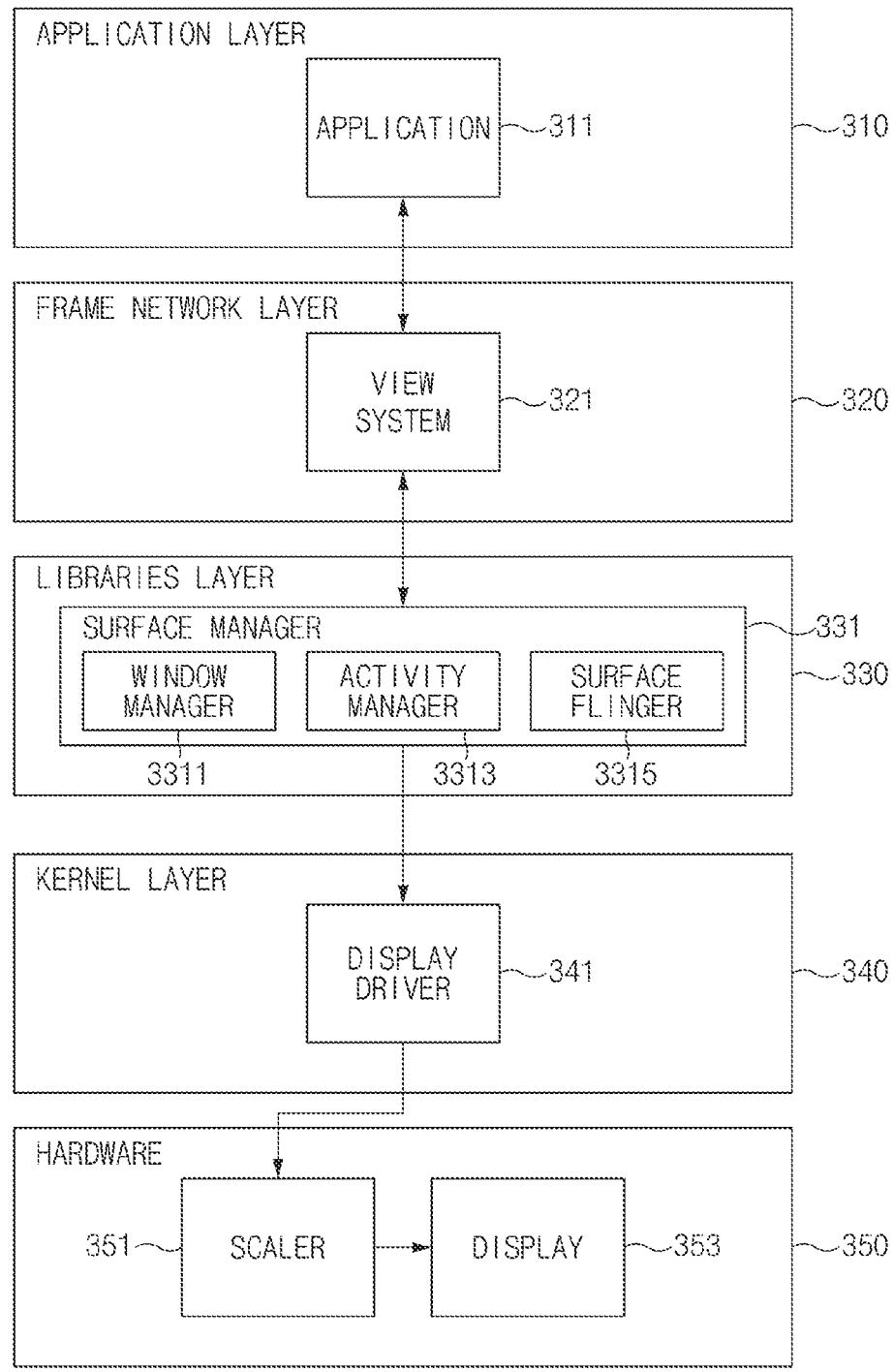
FIG. 3 is a block diagram illustrating an example configuration of an electronic device, according to various embodiments.

FIG. 3 is a block diagram illustrating an example configuration of an electronic device according to various embodiments.

According to an embodiment, an electronic device 300 (e.g., the electronic device 101 in FIG. 1 or the electronic device 200 in FIG. 2) may include an application layer 310 (e.g., the application 146 in FIG. 1), a framework layer 320 (e.g., the middleware 144 in FIG. 1), a libraries layer 330 (e.g., the middleware 144 or the operating system 142 in FIG. 1), a kernel layer 340 (e.g., the operating system 142 in FIG. 1), and a hardware (HW) layer 350. For example, at least some of components at the application layer 310, the framework layer 320, the libraries layer 330, the kernel layer 340, and the hardware layer 350 may be implemented by interaction (e.g., the load and the execution) between a processor (e.g., the processor 120 in FIG. 1 or processor 240 in FIG. 2) and the memory (e.g., the memory 130 in FIG. 1). At least some of the operation of the components included in the application layer 310, the framework layer 320, the libraries layer 330, the kernel layer 340, and the hardware layer 350 may be understood through the operation of the processor (or the display driving circuit (e.g., the display driving circuit 220 in FIG. 2)).

According to an embodiment, the application layer 310 may include at least one application 311. For example, although only one application 311 is illustrated in FIG. 3, the number, the type, and the class of applications 311 are not limited thereto.

According to an embodiment, the framework layer 320 may provide various functions to the application 311 such that the function or information provided from at least one resource of the electronic device 300 may be used by the application 311. According to an embodiment, the framework layer 320 may include a view system. For example, a view system 321 may generate a view to be displayed on a display 353, depending on the activity of the application 311. For example, the application 311 may be implemented in the form of the set of views formed by the view system 321.

According to an embodiment, the libraries layer 330 may be a common layer accessed by a plurality of applications included in the application layer. According to an embodiment, the libraries layer 330 may include a surface manager 331. According to an embodiment, when the application 311 is executed, the surface manager 331 may determine the resolution for the application 311 based on at least a part of the type of the application 311, and may generate a frame image including a region corresponding to the execution screen of the application 311, based on the information of the display region corresponding to the execution screen of the application 311.

According to an embodiment, the surface manager 331 may include a window manager 3311, an activity manager 3313, and a surface flinger 3315. For example, each view (e.g., a region (or an image) corresponding to the execution screen of the application) of the application 311 may be rendered using a graphic library including a graphic instruction. For example, the surface flinger 3315 may merge or compose at least two views. For example, views rendered in application 311 may be merged or composited into one frame image for the display 353 in the surface flinger 3315. For example, the surface flinger 3315 may store the frame image in the frame buffer.

According to an embodiment, the activity manager 3313 may perform at least one of an executing operation, an activating operation, or a removing operation the application 311. For example, the activity manager 3313 may acquire and manage various pieces of information on the execution state (e.g., execution in foreground or background), the life cycle, and the layout of the application 311.

According to an embodiment, the window manager 3311 may manage (e.g., add, delete, and/or change) the composed view (e.g., a frame image). For example, the window manager 3311 may transmit, to the display driving circuit, image data stored in the frame buffer and/or coordinate information (e.g., coordinate information in regions included in the frame image and/or information on the size of the frame image).

According to an embodiment, the kernel layer 340 may include a display driver 341. For example, the display driver 341 may control the display driving circuit (e.g., the display driving circuit 220 in FIG. 2). For example, the display driver 341 may be included in the display driving circuit.

According to an embodiment, the hardware layer 350 may include a scaler 351 of the display driving circuit and the display 353 (e.g., the display module 160 in FIG. 1 or the display panel 210 in FIG. 2). According to an embodiment, the scaler 351 may up-scale at least a portion of the frame image. For example, the scaler 351 may up-scale at least some of the regions included in the frame image based on the frame image, information on the size of the frame image, and/or coordinate information of each of the regions corresponding to the execution screen of the application 311 included in the frame image. For example, the scaler 351 may provide at least partially up-scaled frame image to the display 353. According to an embodiment, the display 353 may display a screen (e.g., an execution screen of the application 311), based on the frame image which is at least partially up-scaled According to an embodiment, the components of the framework layer 320, the libraries layer 330, the kernel layer 340, and the hardware layer 350 are not limited to those illustrated in FIG. 3, and the details of well-known operations related to the framework layer 320, the libraries layer 330, and the kernel layer 340 except for the above-described operations may be omitted to avoid redundancy.

FIGS. 4A, 4B, 4C, 4D and 4E are diagrams illustrating an example operation of an electronic device, according to various embodiments.

According to an embodiment, an electronic device (e.g., the electronic device 101 in FIG. 1, the electronic device 200 in FIG. 2, or the electronic device 300 in FIG. 3) may generate a frame image including regions corresponding to execution screens of the plurality of applications (e.g., the application 146 of FIG. 1) to be displayed on the display (e.g., the display module 160 in FIG. 1, the display 210 in FIG. 2, or the display 353 in FIG. 3). For example, the electronic device may determine the resolution of each of the plurality of applications, based at least partially on the type of each application to generate the regions corresponding to the execution screen. For example, the electronic device may determine, to the higher resolution, the resolution of an application, which needs to be displayed on the display with the higher image quality, in which the application includes an application (e.g., a document application) in a type requiring higher readability due to a large number of texts provided in an execution screen, or an application (e.g., a gallery application, a video application, and an SNS application) in a type requiring higher visibility. For example, the electronic device may determine, to the lower resolution, the resolution of an application in a type, in which image quality (resolution) displayed on the display is relatively less important (e.g., a health application, a financial or bank application, a navigation application, and a music applications). For example, the higher resolution may refer to the resolution equal to or greater than reference resolution (e.g., the resolution of the display (display panel)) for determining whether to up-scale, and the lower resolution may refer to the resolution less than the reference resolution. For example, when determining the resolution of a high-performance application (e.g., a high-performance game application) to the higher resolution, the electronic device may determine the resolution of the high-performance application to the lower resolution if necessary, because the multi-tasking may not be smoothly performed due to insufficient resources of the electronic device 200 when multi-tasking the plurality of applications. For example, the electronic device may determine the resolution of each application, based on at least a portion of a region, which is occupied by the execution screen of each application, in the entire screen display region of the display. For example, when the region for displaying the execution screen of the application occupies the entire screen display region at a specific proportion (e.g., 50%), the resolution for the application may be determined to be higher resolution. For example, the electronic device may provide a user interface for setting the resolution of an application, which is being executed, or an application to be executed, and may determine the resolution for the application based on the input received through the user interface. For example, the electronic device may determine the resolution for the application based on the resolution information set when the application is previously executed. For example, data related to the application may contain information on the resolution information set when the application is previously executed. For example, the electronic device may determine the resolution of an application, based on the information stored in the manifest of the application.

Figure 4A:
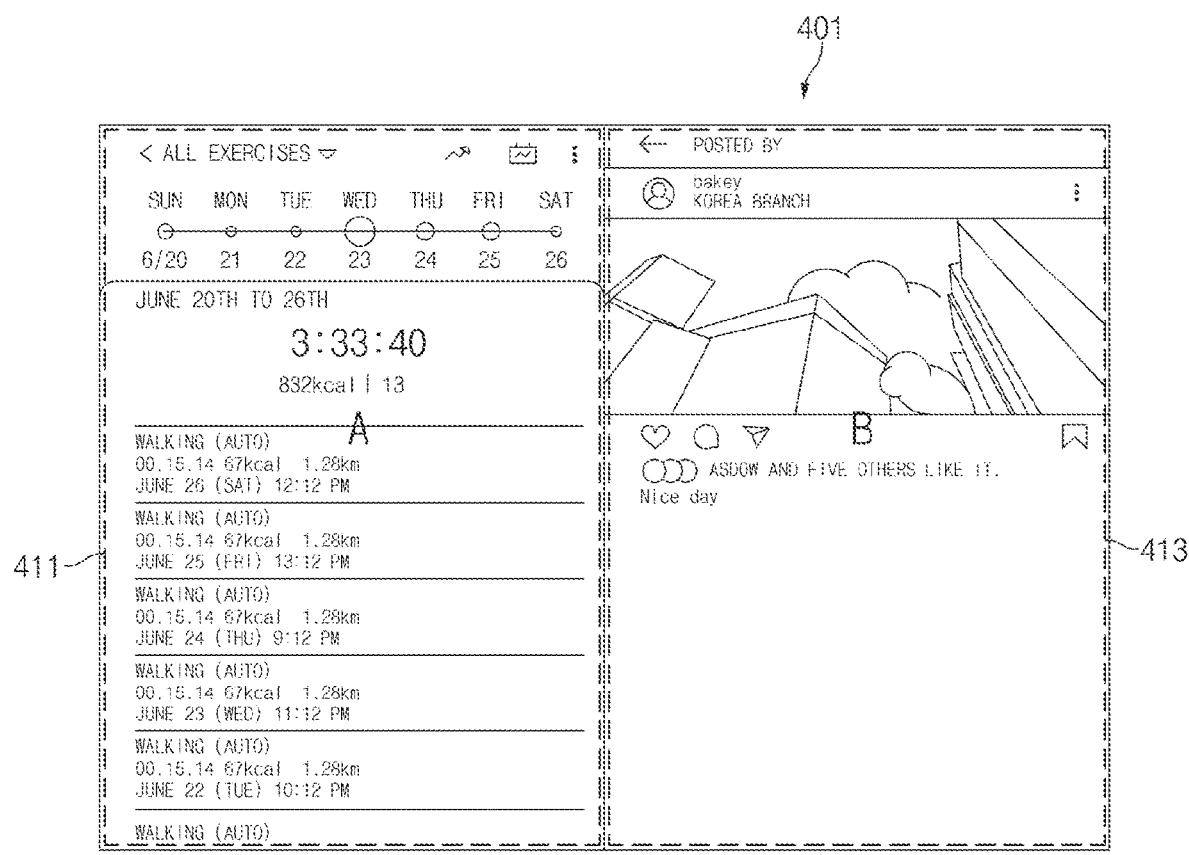
FIGS. 4A, 4B, 4C, 4D and 4E are diagrams illustrating an example operation of an electronic device, according to various embodiments.

Referring to FIG. 4A, a first frame image 401 is illustrated while including a first region 411 corresponding to an execution screen of a first application (e.g., a health application) and a second region 413 corresponding to an execution screen of a second application (e.g., an SNS application). For example, the health application may be an application in a type less important in the image quality (resolution) displayed on the display (e.g., the type not requiring higher readability and visibility). For example, the electronic device may determine the resolution for the application to be the higher resolution, when the proportion of the execution screen of the application, which occupies the entire screen display region of the display, is equal to or greater than the specific proportion, even if the application is in the type not requiring higher readability and visibility. For example, as illustrated in FIG. 4A, the execution screen of the health application may occupy the entire screen display region at the specific proportion (e.g., 50% or more). In this case, the electronic device may determine the resolution of the health application to be the higher resolution. For example, the SNS application may be in a type requiring higher readability, and the electronic device may determine the resolution of the SNS application to be the higher resolution. For example, the electronic device may generate the first frame image 401 including the first region 411 corresponding to the execution screen of the health application determined to have the higher resolution and the second region 413 corresponding to the execution screen of the SNS application determined to have the higher resolution. For example, the first region 411 and the second region 413 may constitute the entire portion of the first frame image 401, and the first frame image 401 may not contain a blank region which does not substantially contain information corresponding to the execution screen of the application. For example, the positions of the first region 411 and the second region 413 in the first frame image 401 may correspond to the display regions (e.g., the positions of the execution screen of the first application and the execution screen of the second application on the display panel) corresponding to the execution screen of the first application and the execution screen of the second application on the display panel. According to an embodiment, the electronic device may differently determine the resolution for the application depending on the content displayed on the display panel, even with respect to the same application. For example, even with respect to the same gallery application, the electronic device may determine the resolution for the application to be the lower resolution, when the image displayed on the display panel is a landscape image, and may determine the resolution for the application to be the higher resolution, when the image displayed on the display panel is an image containing text.

Figure 4B:
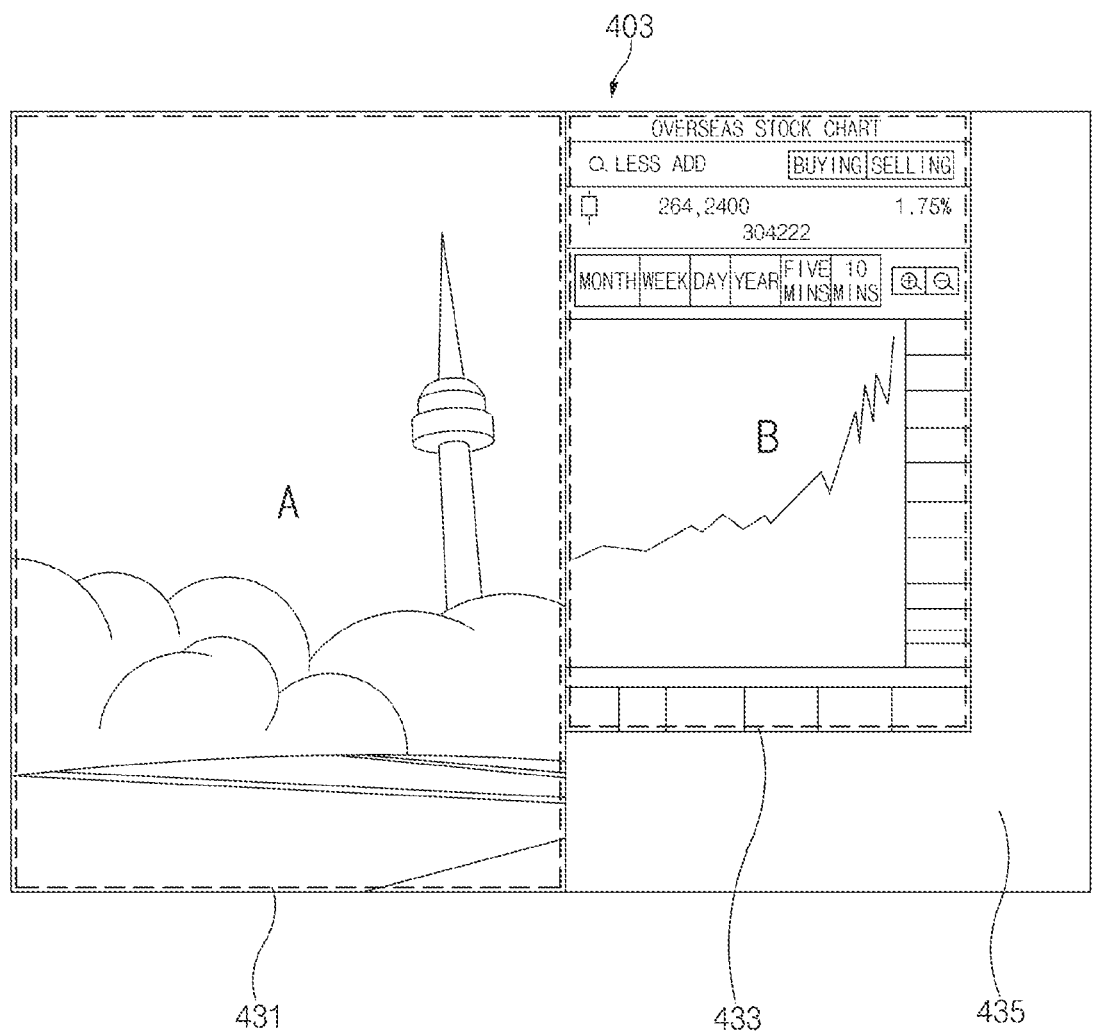

Referring to FIG. 4B, a second frame image 403 is illustrated while including a third region 431 corresponding to an execution screen of a third application (e.g., a gallery application) and a fourth region 433 corresponding to an execution screen of a fourth application (e.g., a financial (stock) application). For example, the gallery application may be in a type requiring high visibility, and the electronic device may determine the resolution of the gallery application to be the higher resolution. The stock application may be in a type not requiring higher readability or visibility, and the electronic device may determine the financial application to be the lower resolution. For example, the electronic device may generate the second frame image 403 including the third region 431 corresponding to the execution screen of the gallery application determined to have the higher resolution and the fourth region 433 corresponding to the execution screen of the financial application determined to have the lower resolution. For example, the third region 431 may occupy the entire portion of the left split region of the second frame image 403, and the fourth region 433 may include a portion of the right split region of the second frame image 403. For example, the right split region of the second frame image 403 may include a blank region 435 which does not contain information corresponding to the execution screen of the application. For example, the positions of the third region 431 and the fourth region 433 in the second frame image 403 may correspond to the display regions corresponding to the execution screen of the third application and the execution screen of the fourth application on the display panel.

Figure 4C:
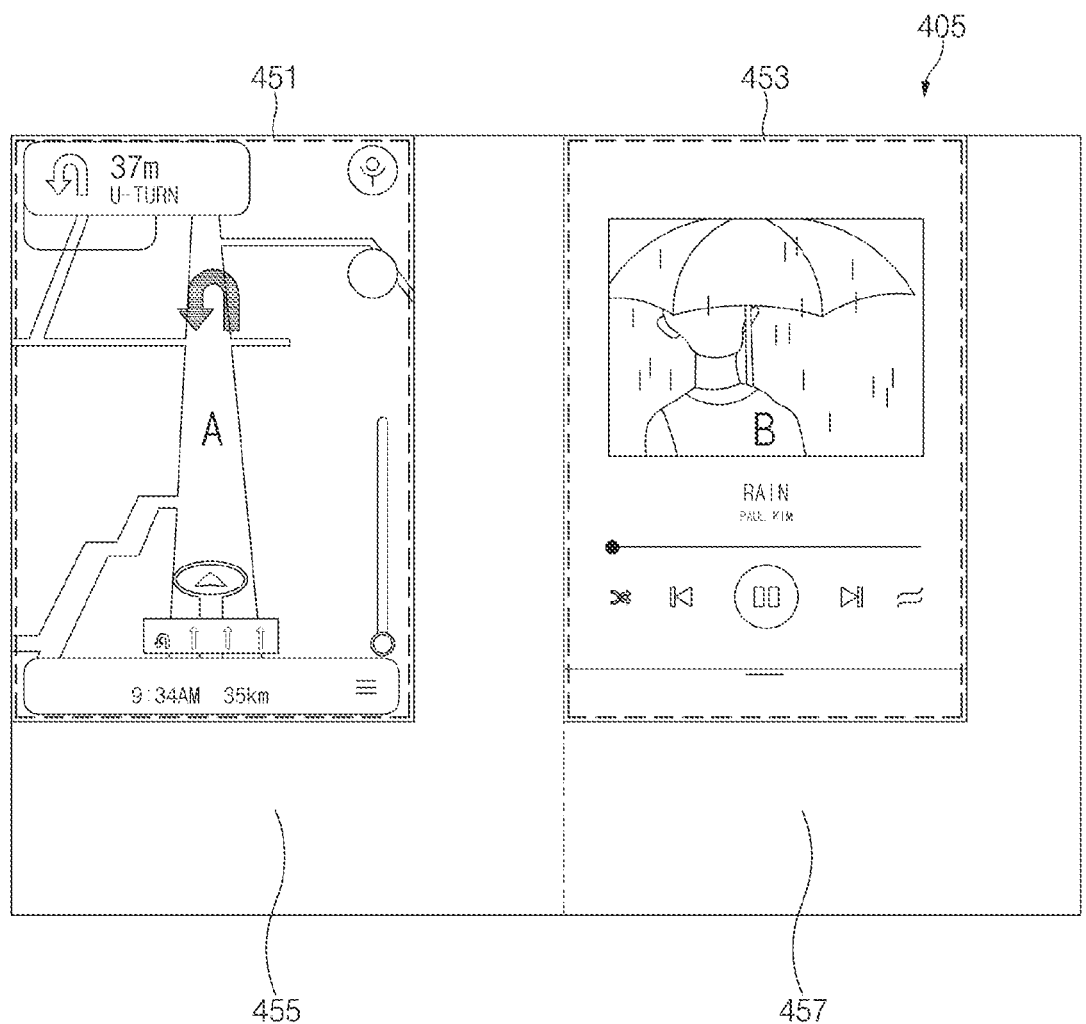

Referring to FIG. 4C, a third frame image 405 is illustrated while including a fifth region 451 corresponding to an execution screen of a fifth application (e.g., a navigation application) and a sixth region 453 corresponding to an execution screen of a second application (e.g., an music application). For example, the navigation application and the music application may be in a type not requiring higher visibility, and the electronic device may determine the resolutions of the navigation application and the music application to be the lower resolutions. For example, the electronic device may generate the third frame image 405 including the fifth region 451 corresponding to the execution screen of the navigation application determined to have the lower resolution and the sixth region 453 corresponding to the execution screen of the music application determined to have the lower resolution. For example, the fifth region 451 may include a portion of the left split region of the third frame image 405, and the sixth region 405 may include a portion of the right split region of the third frame image 403. For example, the left and right split regions of the third frame image 405 may include blank regions 455 and 457 which do not contain information corresponding to the execution screens of the applications. For example, the positions of the third region 451 and the fourth region 453 in the third frame image 405 may correspond to the display regions corresponding to the execution screen of the fifth application and the execution screen of the sixth application on the display panel.

Figure 4D:
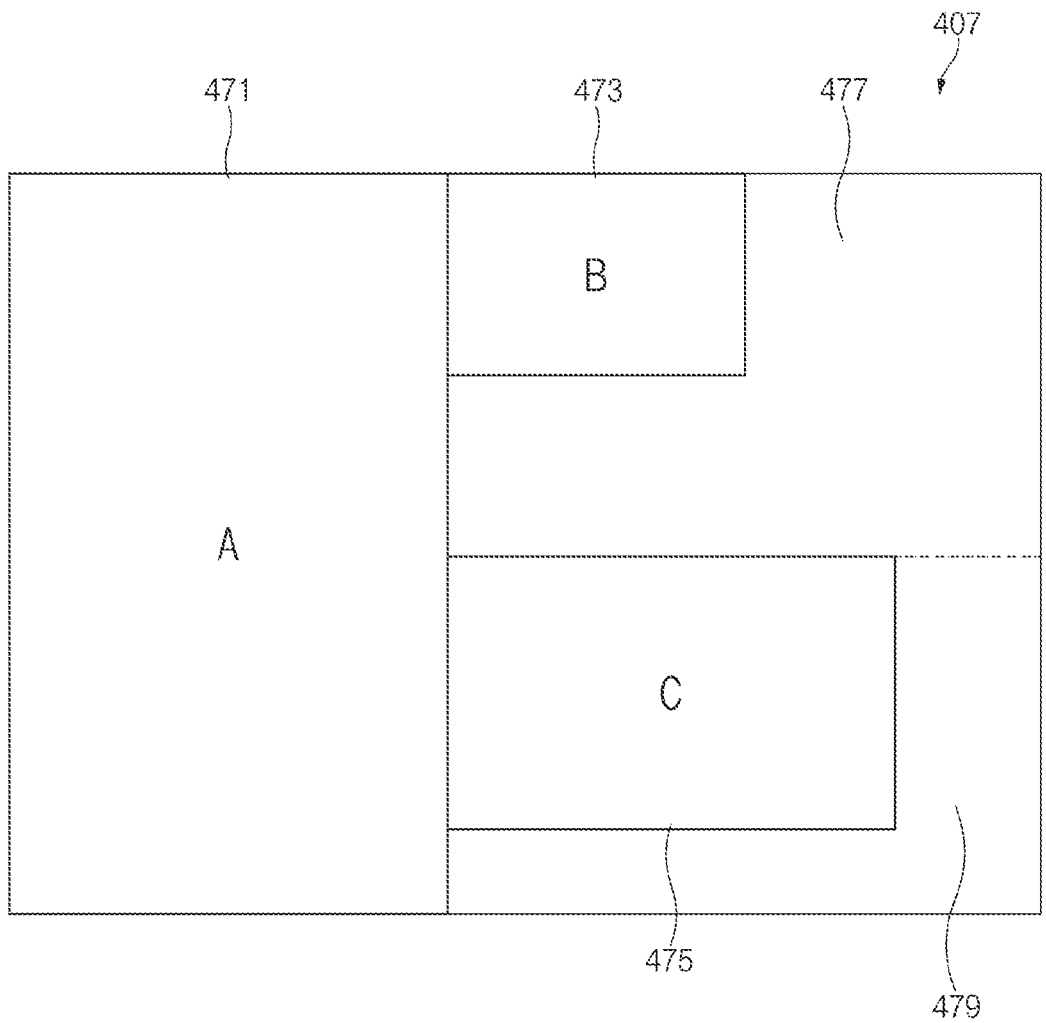

Referring to FIG. 4D, a fourth frame image 407 is illustrated while including a seventh region 471 corresponding to an execution screen of a seventh application 'A', an eighth region 473 corresponding to an execution screen of an eighth application 13', and a ninth region 475 corresponding to an execution screen of a ninth application 'C'. For example, FIG. 4D illustrates that the electronic device determines the resolution of the seventh application to be the higher resolution, and the resolution of the eighth application and the resolution of the ninth application to be the lower resolution. For example, the seventh region 471 may occupy the left split region of the fourth frame image 407, the eighth region 473 may include a portion of the right-upper split region of the fourth frame image 407, and the ninth region 475 may include the right-lower split region of the fourth frame image 407. For example, the seventh region 471 may occupy the entire portion of the left split region of the fourth frame image 407, and the right upper and lower split regions of the fourth frame image 407 may include blank regions 477 and 479 which do not contain information corresponding to the execution screens of the applications. For example, the positions of the seventh region 471, the eighth region 473, and the ninth region 475 in the fourth frame image 407 may correspond to the display regions corresponding to the execution screen of the seventh application, the execution screen of the eighth application and the execution screen of the ninth application.

Figure 4E:
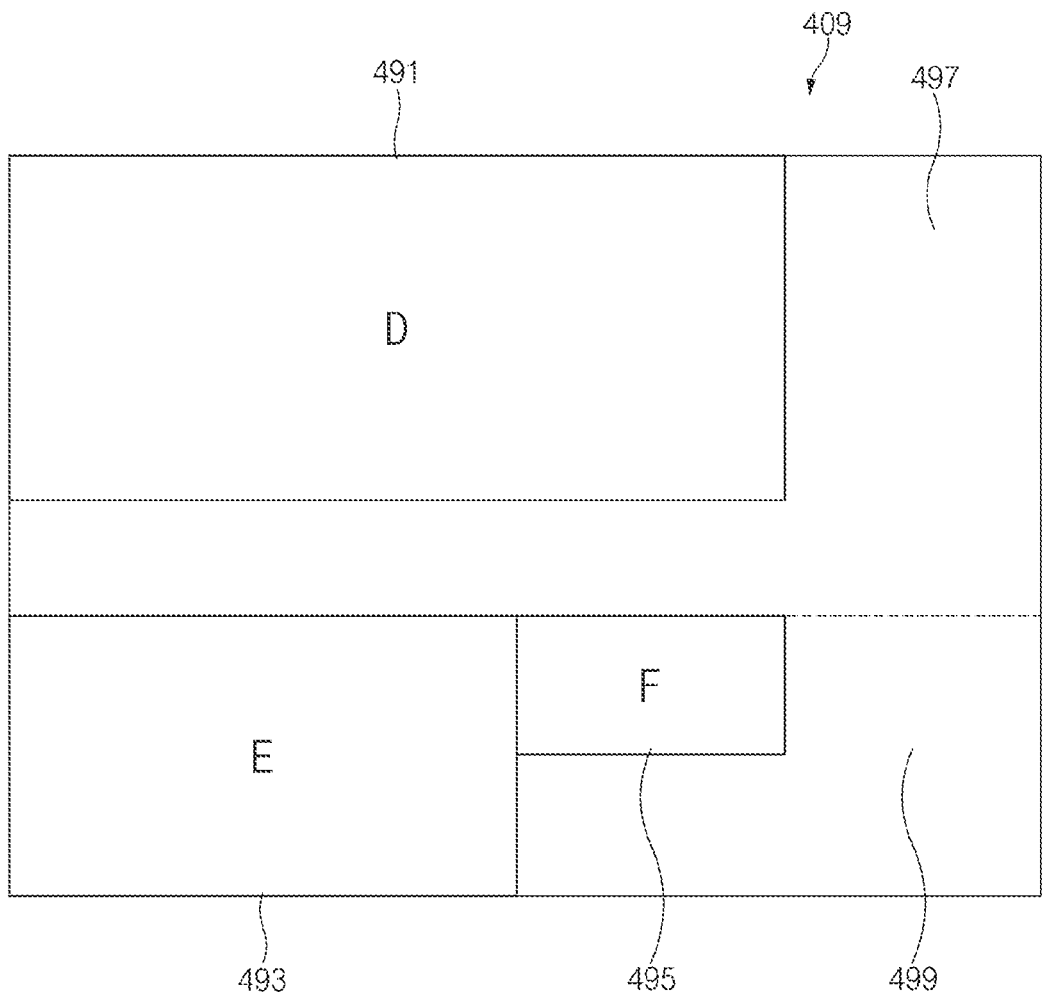

Referring to FIG. 4E, a fifth frame image 409 is illustrated while including a tenth region 491 corresponding to an execution screen of a tenth application 'D', an eleventh region 493 corresponding to an execution screen of an eleventh application 'E', and a twelfth region 495 corresponding to the execution screen of a twelfth application 'F'. For example, FIG. 4E illustrates that the electronic device determines the resolutions of the tenth application, the eleventh application, and the twelfth application to be the lower resolution. For example, the tenth region 491 may include a portion of an upper split region of the fifth frame image 409, the eleventh region 493 may occupy a the left lower split region of the fifth frame image 409, and the twelfth region 495 may form a portion of the right lower split region of the fifth frame image 409. For example, the upper split region and the right lower split region of the fifth frame image 409 may include blank regions 497 and 499 which do not contain information corresponding to the execution screen of the application. For example, the positions of the tenth region 491, the eleventh region 493, and the twelfth region 495 in the fifth frame image 409 may correspond to the display region corresponding to the execution screen of the tenth application, the execution screen of the eleventh application, and the execution screen of the twelfth application.

According to an embodiment, the electronic device (e.g., the display driving circuit) may up-scale at least some of the regions included in the frame image and display an execution screen of each of the plurality of applications on the display panel, based on the up-scaled frame image. For example, the electronic device may partially up-scale at least one region corresponding to the execution screen of the application determined to have the lower resolution in the frame image. For example, the electronic device may up-scale the fourth region 433 of FIG. 4B, the fifth region 451 and the sixth region 453 of FIG. 4C, the seventh region 471 and the eighth region 473 of FIG. 4D, and the tenth region 491 and the twelfth region 495 of FIG. 4E. For example, the electronic device may up-scale at least a portion of a frame image based on information on the size of the frame image and/or coordinate information of each region included in the frame image. An embodiment in which the electronic device partially up-scales the frame image using coordinate information will be described in greater detail below with reference to FIGS. 9A, 9B, 9C, 10A and 10B.

Figure 5:
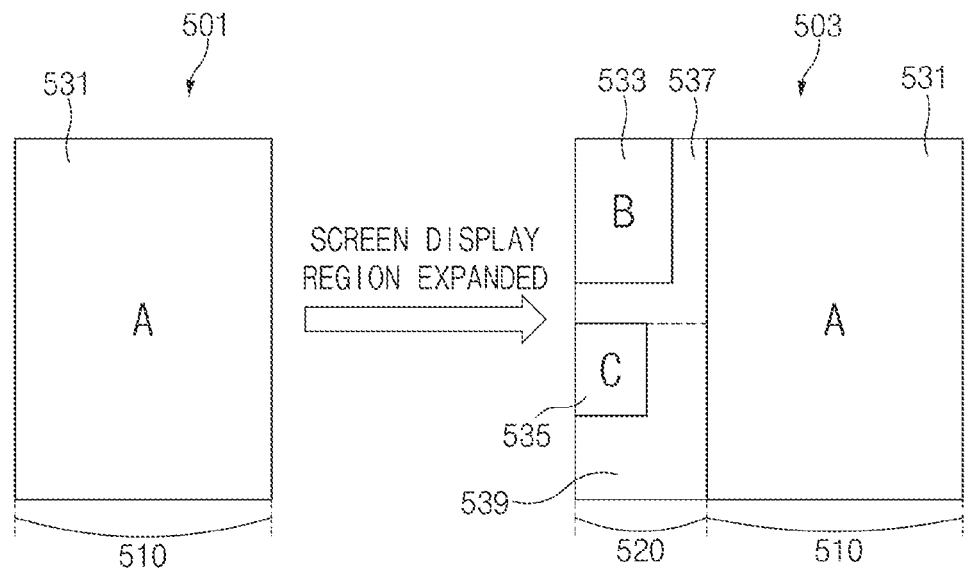
FIG. 5 is a diagram illustrating an example operation of an electronic device, according to various embodiments.

FIG. 5 is a diagram illustrating an example operation of an electronic device, according to various embodiments.

According to an embodiment, the electronic device (e.g., the electronic device 101 of FIG. 1, the electronic device 200 of FIG. 2, or the electronic device 300 of FIG. 3) may include a flexible display (e.g., the display module 160 of FIG. 1 or the display panel 210 of FIG. 2) which expands or contracts screen display regions 510 and 520. For example, the electronic device may include a slidable display or a foldable display.

For example, reference numeral '501' represents a first frame image when the screen display region of the display is contracted, and reference numeral '503' represents a second frame image when the screen display region of the display is expanded. For example, as a slidable display slides to expand, or a foldable display is unfolded, the second frame image 503 may be generated to include a part 520 corresponding to a region for displaying an expanded screen of the display. For example, the first frame image 501 may include only the part 510 corresponding to the display having the screen display region which is contracted, and the second frame image 503 may include the part 510 corresponding to the display having the screen display region which is contracted and the part 520 corresponding to the screen display region of the display, which is expanded.

According to an embodiment, when the contracted screen display region is changed to the expanded screen display region in the display, the electronic device may determine the resolution of an application, which is to be displayed on the expanded screen display region, to be the lower resolution. For example, the lower resolution may refer to the resolution less than a reference resolution value (e.g., the resolution of the display). For example, when an "A" application is being executed and an application "B" and/or "C" application is executed on the extended screen display region, the electronic device may determine the resolution for the "B" application and/or "C" application to be lower resolution. For example, the electronic device may generate a frame image including an "a" region 531 corresponding to the execution screen of the "A" application, a "b" region 533 corresponding to the execution screen of the application 'B', and a "c" region 535 corresponding to the execution screen of the "C" application. For example, in the second frame image 503, the positions of the "a" region 531, the "b" region 533, and the "c" region 535 may correspond to the display regions (e.g., the positions for displaying the execution screen of the "A" application, the execution screen of the "B" application, and the execution screen of the "C" application on the display) corresponding to the execution screen of the "A" application, the execution screen of the "B" application, and the execution screen of the "C" application on the display. For example, the "b" region 533 may include a portion of the upper split region of the part 520 corresponding to the expanded screen display region in the second frame image 503, and the "c" region 535 may include a portion of the lower split region of the part 520 corresponding to the expanded screen display region in the second frame image 503. For example, the upper and lower split regions corresponding to the expanded screen display region 520 in the second frame image 503 may include blank regions 537 and 539 which do not contain information corresponding to the execution screen of the application.

According to an embodiment, the electronic device may up-scale at least one of the regions (e.g., the "a" region 531 and the "b" region 533) included in the second frame image 503, and may display an execution screen of each of a plurality of applications (e.g., applications "A", "B", and "C") on the display based at least partially on the second frame image 503 which is up-scaled. For example, the electronic device may partially up-scale the "b" region 533 and/or the "c" region 535 in the second frame image 503, and may display the execution screens of the applications "A", "B", and "C", based at least partially on the up-scaled second frame image 503.

Figure 6:
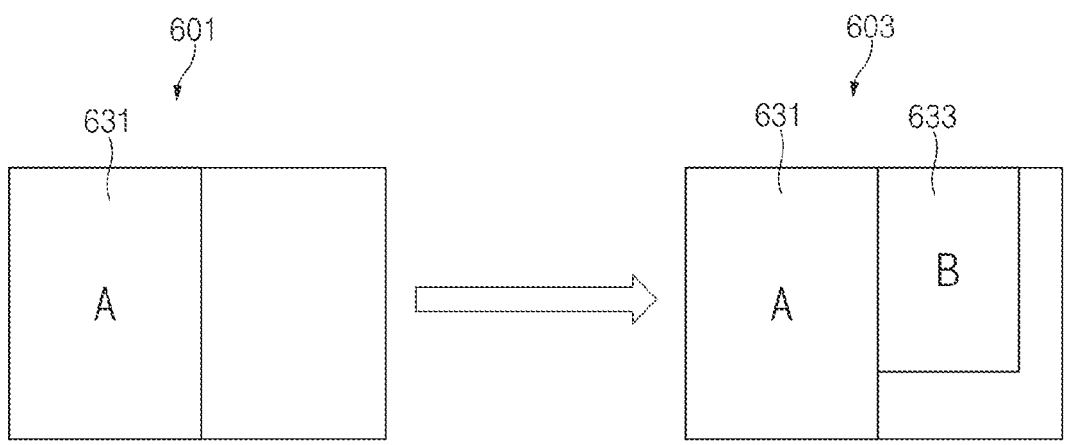
FIG. 6 is a diagram illustrating an example operation of an electronic device, according to various embodiments.

FIG. 6 is a diagram illustrating an example operation of an electronic device, according to various embodiments.

According to an embodiment, the electronic device (e.g., the electronic device 101 of FIG. 1, the electronic device 200 of FIG. 2, or the electronic device 300 of FIG. 3) may split the screen of the display (e.g., the display module 160 of FIG. 1, the display panel 210 of FIG. 2, or the display 353 of FIG. 3), in response to a user input. For example, the electronic device may split the screen of the display in response to a user input for providing a multi-window screen. For example, the user input may include an input for additionally executing a "B" application while executing an "A" application. For example, the electronic device may split the screen of the display, in response to the user input, while the execution screen of the "A" application is displayed to the full screen, and may display the execution screen of the "A" application on a portion of the split region. According to an embodiment, when the "B" application is executed, the electronic device may provide a user interface for determining the resolution for the "B" application. For example, the electronic device may determine the resolution for the "B" application while maintaining the execution state of the "A" application, based on user input received through the user interface.

According to an embodiment, the electronic device may receive a user input for selecting at least one of a plurality of applications while executing the plurality of applications, and may provide a user interface for setting the resolution of the at least one application which is selected. For example, the electronic device may change the resolution of the selected at least one application, based on user input received through the user interface. For example, the electronic device may change the resolution while maintaining the execution state of the at least one application which is selected. For example, while executing the "A" application and the "B" application, the electronic device may change the resolution of some applications (e.g., the "B" application) from the higher resolution to the lower resolution, based on the selection by the user and/or the user input. In this case, the electronic device may change only the settings (e.g., the configuration) associated with the resolution for the "B" application, instead of terminating, re-executing, or resetting the "B" application. For example, the electronic device may change the resolution for the "B" application, which is selected, without an influence on the process, which is being executed, in another foreground, by transmitting a notification for changing the resolution only to the selected "B" application.

For example, a first frame image 601 includes an "a" region 631 corresponding to the execution screen of an "A" application before generating a "b" region corresponding to the execution screen of a "B" application, after splitting a screen. A second frame image 603 includes the "a" region 631 corresponding to the execution screen of the "A" application and a "b" region 633 corresponding to the execution screen of the "B" application. For example, when the "A" application is set to have a higher resolution, the electronic device may generate the "a" region 631 corresponding to the execution screen of the "A" application to have the higher resolution. For example, the "a" region 631 may be included in a region corresponding to a display region (e.g., a region (left region) for displaying an execution screen of the "A" application on the display) corresponding to the execution screen of the "A" application, in the frame images 601 and 603. For example, when the "B" application is executed, when the "B" application is set to have the lower resolution or when the resolution for the "B" application which is being executed, is changed from the higher resolution to the lower resolution, the electronic device may generate the "b" region 633 corresponding to the execution screen of the "B" application, with the lower resolution. For example, the "b" region 633 may be included in a region, which corresponds to a display region (e.g., a region (right region) for displaying the execution screen of the "B" application) corresponding to the execution screen of the "B" application, of the split regions of the display.

According to an embodiment, although FIG. 6 illustrates that the resolution for the "B" application is determined to a specified lower resolution, or is changed from a higher resolution to a lower resolution, the disclosure is not limited thereto. In addition, the number of applications which are simultaneously being executed is not limited to two applications.

Figure 7:
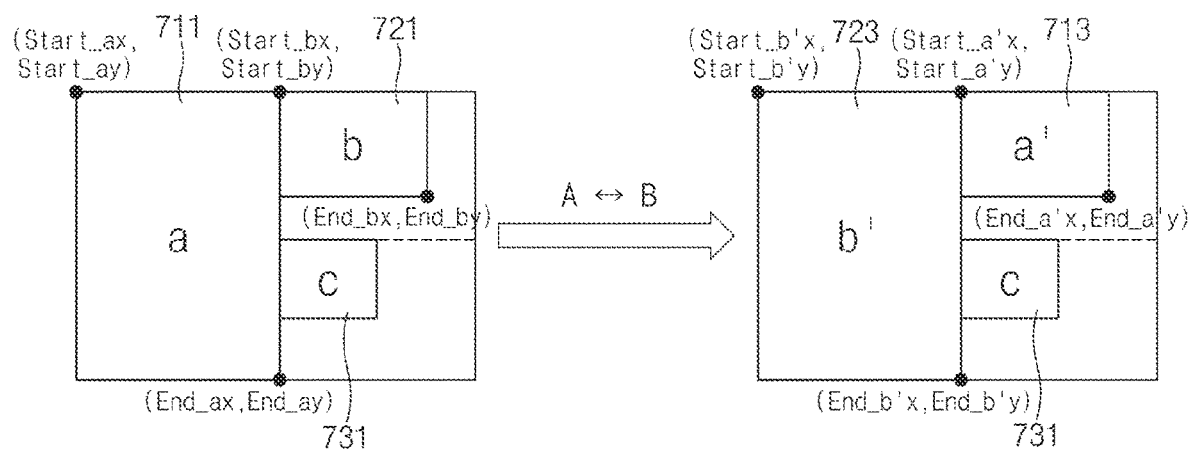
FIG. 7 is a diagram illustrating an example operation of an electronic device, according to various embodiments.

FIG. 7 is a diagram illustrating an example operation of an electronic device, according to various embodiments. For example, FIG. 7 illustrates a frame image when the display positions of the execution screens of the applications are switched to each other and when the resolutions of the applications are inherited.

For example, in the following description, it is assumed that the electronic device (e.g., the electronic device 101 of FIG. 1, the electronic device 200 of FIG. 2, or the electronic device 300 of FIG. 3) switches the display position of the execution screen of an "A" application and the display position the execution screen of a "B" application to each other, while displaying the execution screen of the "A" application, the execution screen of the "B" application, and the execution screen of the "C" application on the display (e.g., the display module 160 of FIG. 1, the display panel 210 of FIG. 2, or the display 353 of FIG. 3).

For example, the electronic device may set the resolution for the "A" application and the resolution for the "B" application by switching the resolution for the "A" application and the resolution for the "B" application to each other, and may switch between coordinate information of an "a" region 711, which corresponds to the execution screen of the "A" application, and coordinate information of a "b" region 721, which corresponds to the execution screen of the "B" application, to each other. In this case, scaling factors are inherited between the "a" region 711 and the "b" region 721. For example, when the resolution for the "A" application is set to be the higher resolution and the resolution for the "B" application is set to the lower resolution before switching the display positions of the execution screens to each other, the resolution for the "A" application may be changed to the lower resolution and the resolution for the "B" application may be changed to the higher resolution, after switching the display positions of the execution screens to each other. For example, the coordinate information of the "a" region 711 before switching the display positions of the execution screens to each other, is changed to coordinate information of the "b'" region 723 after switching the display position of the execution screens to each other. In addition, the coordinate information of the "b" region 721 before switching the display positions of the execution screens to each other is changed to coordinate information of the "a'" region 713 after switching the display position of the execution screens to each other. For example, when start coordinate information and end coordinate information of the "a" region 711 correspond to (Start_ax, Start_ay) and (End_ax, End_ay) before switching the display positions of the execution screens to each other, and start coordinate information and end coordinate information of the "b'" region 723 after switching the display positions of the execution screens to each other correspond to (Start_b'x, Start_b'y) and (End_b'x, End_b'y), respectively, the coordinate information (Start_b'x, Start_b'y) is the same as coordinate information (Start_ax, Start_ay), and coordinate information (End_b'x, End_b'y) is the same as coordinate information (End_ax, End_ay). In addition, when start coordinate information and end coordinate information of the "b" region 721 correspond to (Start_bx, Start_by) and (End_bx, End_by) before switching the display positions of the execution screens to each other, and start coordinate information and end coordinate information of the "a'" region 713 after switching the display positions of the execution screens to each other correspond to (Start_a'x, Start_a'y) and (End_a'x, End_a'y), respectively, the coordinate information (Start_a'x, Start_a'y) is the same as coordinate information (Start_bx, Start_by), and coordinate information (End_a'x, End_a'y) is the same as coordinate information (End_bx, End_by). For example, since the display position of the execution screen of a "C" application is not changed, the resolution for the "C" application and the coordinate information of the "C" region 731 may be maintained without change.

Figure 8:
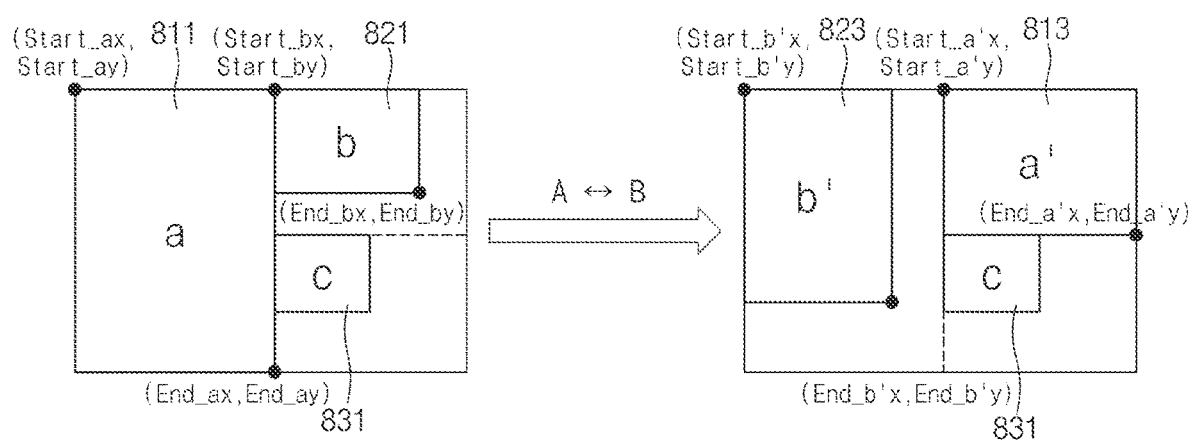
FIG. 8 is a diagram illustrating an example operation of an electronic device, according to various embodiments.

FIG. 8 is a diagram illustrating an example operation of an electronic device, according to various embodiments. For example, FIG. 8 illustrates a frame image when the display positions of the execution screens of the applications are switched to each other and when the resolutions of the applications are maintained.

For example, in the following description, it is assumed that the electronic device (e.g., the electronic device 101 of FIG. 1, the electronic device 200 of FIG. 2, or the electronic device 300 of FIG. 3) switches display positions of the execution screen of an "A" application and the execution screen of a "B" application to each other, based on a user input, while displaying the execution screen of the "A" application, the execution screen of the "B" application, and the execution screen of the "C" application on the display (e.g., the display module 160 of FIG. 1, the display panel 210 of FIG. 2, or the display 353 of FIG. 3).

For example, the electronic device may maintain the resolution set for the "A" application and the resolution set for the "B" application without change, and may change (set newly) coordinate information of an "a" region 811 corresponding to the execution screen of the "A" application and coordinate information of a "b" region 821 corresponding to the execution screen of the "B" application. In this case, scaling factors are maintained for the "a" region 811 and the "b" region 821. For example, when the resolution for the "A" application and the resolution for the "B" application are set to the higher resolution and the lower resolution, respectively, before switching the display positions of the execution screens to each other, the resolution for the "A" application may be maintained to be the higher resolution, and the resolution for the "B" application may be maintained to the lower resolution after switching the display positions of the execution screens to each other. For example, after switching the display positions of the execution screens to each other, the coordinate information of an "a'" region 813 is changed depending on the resolution for the "A" application, regardless of the coordinate information of the "b" region 821, and the coordinate information of a "b'" region 823 may be changed depending on the resolution for the "B" application, regardless of the coordinate information of the "a" region 811. In addition, when start coordinate information and end coordinate information of the "a" region 811 correspond to (Start_ax, Start_ay) and (End_ax, End_ay) before switching the display positions of the execution screens to each other, and start coordinate information and end coordinate information of the "b'" region 823 after switching the display positions of the execution screens to each other correspond to (Start_b'x, Start_b'y) and (End_b'x, End_b'y), respectively, even though the coordinate information (Start_b'x, Start_b'y), which is the start coordinate information of the "W" region 823, is the same as coordinate information (Start_ax, Start_ay), coordinate information (End_b'x, End_b'y), which represents the end coordinate information of the "W" region 823 may differ from coordinate information (End_ax, End_ay). In addition, when the start coordinate information of the "b" region 821 corresponds to (Start_bx, Start_by) before switching the display positions of the execution screens to each other, and start coordinate information and end coordinate information of the "a'" region 813 after switching the display positions of the execution screens to each other correspond to (Start_a'x, Start_a'y) and (End_a'x, End_a'y), even though the coordinate information (Start_a'x, Start_a'y), which is the start coordinate information of the "a'" region 813, is the same as coordinate information (Start_bx, Start_by), coordinate information (End_a'x, End_a'y), which represents the end coordinate information of the "a'" region 813 may differ from coordinate information (End_bx, End_by). For example, since the display position of the execution screen of a "C" application is not changed, the resolution of the "C" application and the coordinate information of the "C" region 831 may be identically maintained.

According to an embodiment, when the display positions of the execution screens of the applications are mutually switched to each other, the electronic device may inherit the resolutions (or scaling factors) of the applications depending on the characteristic or the type of the application, a user input and/or user settings as illustrated in FIG. 7, or may maintain the resolutions (or scaling vectors) of the applications as illustrated in FIG. 8.

Figure 9A:
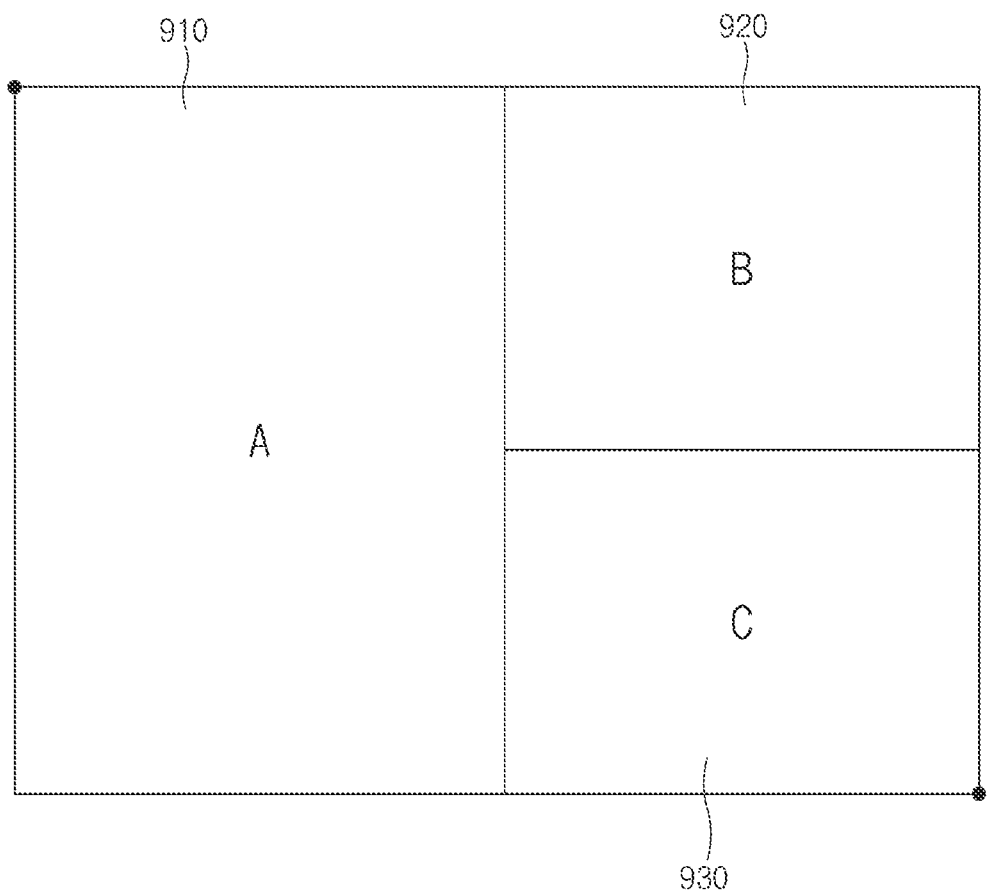
FIGS. 9A, 9B and 9C are diagrams illustrating an example operation of an electronic device, according to various embodiments.
Figure 9B:
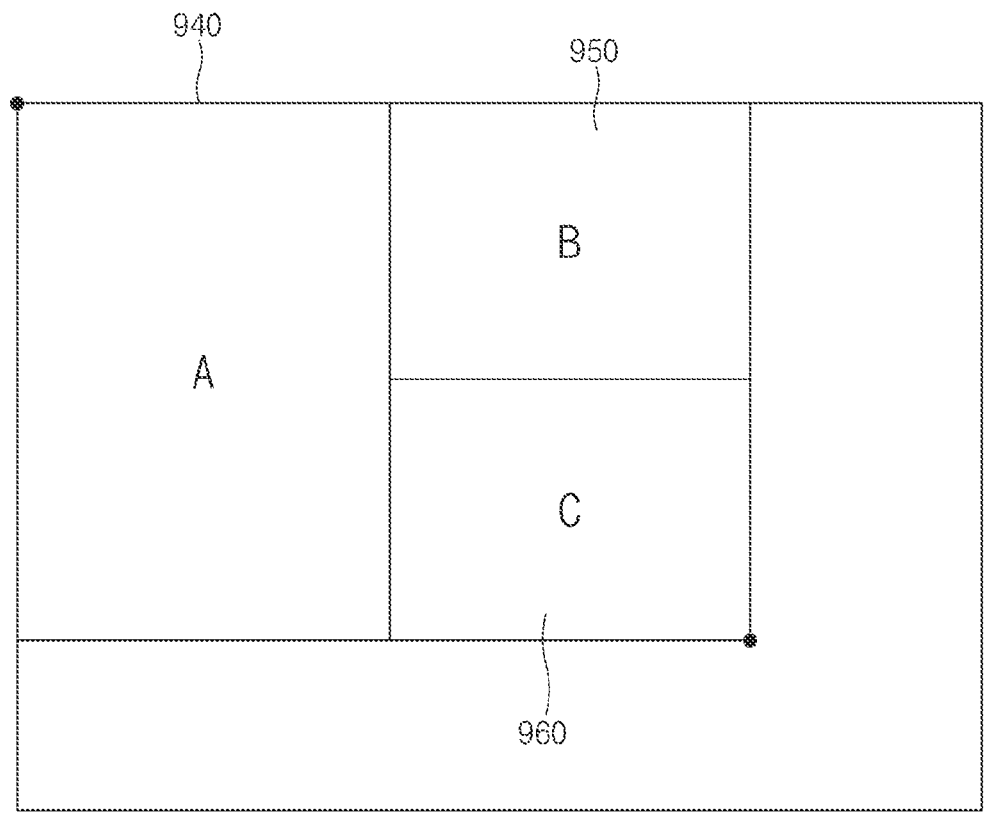
Figure 9C:
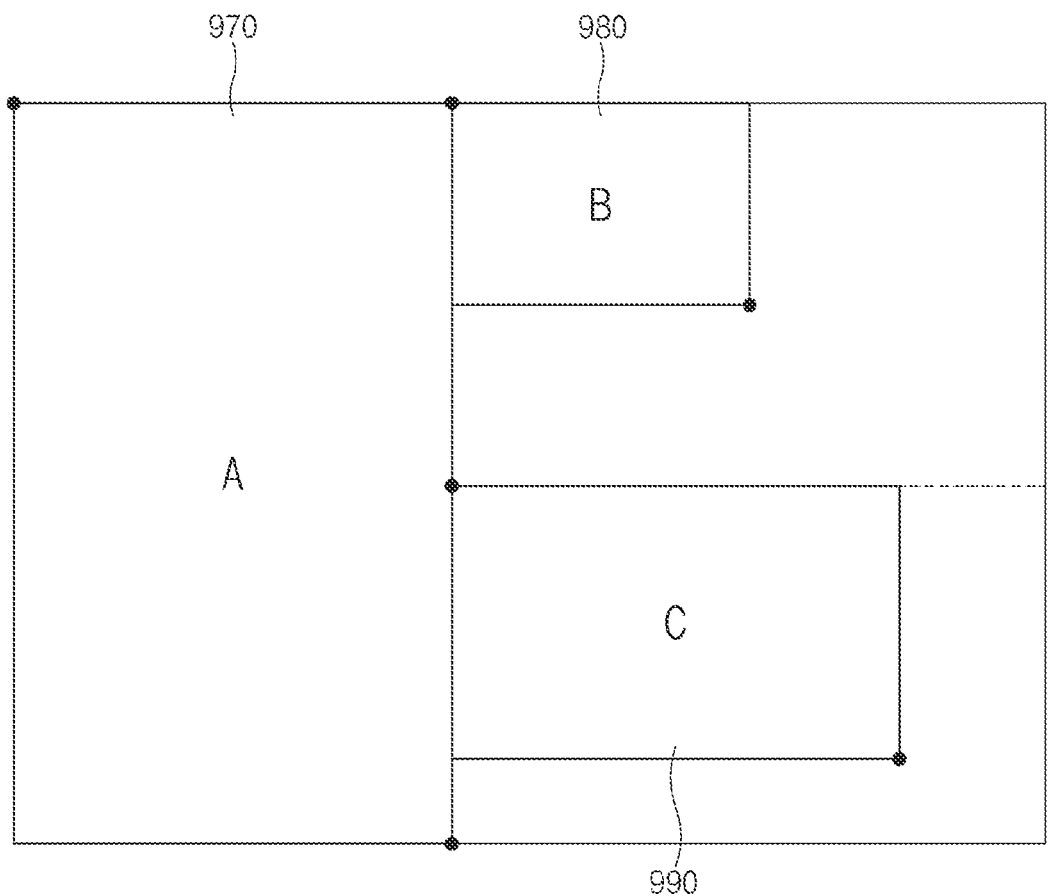

FIGS. 9A, 9B and 9C are diagrams illustrating an example operation of an electronic device, according to various embodiments.

According to an embodiment, an electronic device (e.g., the electronic device 101 of FIG. 1, the electronic device 200 of FIG. 2, or the electronic device 300 of FIG. 3) may up-scale at least a portion (e.g., at least one of regions included in the frame image) of the frame image, based on the coordinate information of the frame image and/or the coordinate information of the region corresponding to the execution screen of the application included in the frame image. For example, a processor (e.g., the processor 120 of FIG. 1 or the processor 230 of FIG. 2) of the electronic device may transmit at least a portion of a frame image stored in a frame buffer, coordinate information of the frame image, and/or coordinate information of a region corresponding to the execution screen of the application included in the frame image, to a display driving circuit (e.g., the display driving circuit 220 of FIG. 2 or the display driver 341 of FIG. 3). The display driving circuit may at least temporarily write the frame image, which is at least partially up-scaled, in a graphic memory (e.g., a graphic random access memory (GRAM)), based on the received frame image and coordinate information. For example, the display driving circuit may include a scaler (e.g., the scaler 351 of FIG. 3) to at least partially up-scale the frame image, and may at least partially up-scale the frame image through the scaler. For example, the display driving circuit may display a screen corresponding to the frame image, which is at least partially up-scaled, to the display panel.

For example, FIG. 9A illustrates a frame image which does not need to be up-scaled, as an "A" application, a "B" application, and a "C" application are set to have higher resolutions. For example, the higher resolution may refer to resolution equal to or greater than a reference resolution value (e.g., the resolution of the display) for determining whether the frame image needs to up-scaled. For example, a first region 910 corresponding to the execution screen of the "A" application, a second region 920 corresponding to the execution screen of the "B" application, and a third region 930 corresponding to the execution screen of the "C" application may be generated to have higher resolutions and may be included in the frame image. For example, the first region 910, the second region 920, and the third region 930 may include the entire portion of the frame image. In this case, as execution screens (regions 910, 920, and 930 corresponding to the execution screen) of all applications are generated to have the higher resolutions, the execution screens of the "A" application, the "B" application, and the "C" application may be provided to have higher image quality. For example, when the "A" application, the "B" application, and the "C" application are applications requiring higher visibility and higher image quality, the electronic device may set the resolutions of the "A" application, the "B" application, and the "C" application to higher resolutions, and may set the resolution of a frame image to the higher resolution from the initial stage, thereby providing the high-quality execution screen without up-scaling the frame image.

For example, FIG. 9B illustrates a frame image collectively up-scaled in entire portion. For example, in FIG. 9B, it is assumed that an "A" application, a "B" application, and a "C" application are set to have lower resolutions. For example, the electronic device may collectively up-scale a fourth region 940 corresponding to the execution screen of the "A" application, a fifth region 950 corresponding to the execution screen of the "B" application, and a sixth region 960 corresponding to the execution screen of a "C" application, which are included in the frame image. For example, the electronic device may minimize and/or reduce power or resources to be consumed to display the execution screen on the display by collectively up-scaling the fourth region 940 corresponding to the execution screen of the "A" application, the fifth region 950 corresponding to the execution screen of the "B" application, and the sixth region 960 corresponding to the execution screen of a "C" application, which are included in the frame image. For example, when the "A" application, the "B" application, and the "C" application are applications not requiring either higher visibility or higher image quality, the electronic device may set the resolutions of the "A" application, the "B" application, and the "C" application to lower resolutions, and may set the resolution of the frame image (e.g., the fourth region 940, the fifth region 950, and the sixth region 960) to the lower resolution from the initial stage, thereby collectively up-scaling the frame image, such that the resource consumption may be minimized and/or reduced.

FIG. 9C illustrates that an electronic device partially up-scales a frame image, according to various embodiments. For example, FIG. 9C illustrates that the resolution for the "A" application is set to be a higher resolution, and the resolutions of the "B" application and the "C" application are set to be lower resolutions. For example, the electronic device may generate a frame image including a seventh region 970 corresponding to the execution screen of the "A" application, an eighth region 980 corresponding to the execution screen of the "B" application, and a ninth region 990 corresponding to the execution screen of the "C" application. The electronic device may partially up-scale the frame image. For example, the electronic device may up-scale the eighth region 980 and the ninth region 990 without up-scaling the seventh region 970 generated to have the higher resolution. For example, the electronic device may determine a part to be up-scaled based on coordinate information of the frame image and coordinate information of each of the regions 970, 980, and 990 included in the frame image, and may at least partially up-scale the frame image. For example, the electronic device may at least partially up-scale the frame image, thereby preventing and/or reducing the image quality from being degraded while reducing the power consumed to display the screen of the display. Hereinafter, the following description will be made with reference to FIGS. 10A and 10B, regarding the frame image partially up-scaled based on the coordinate information according to an embodiment.

Figure 10A:
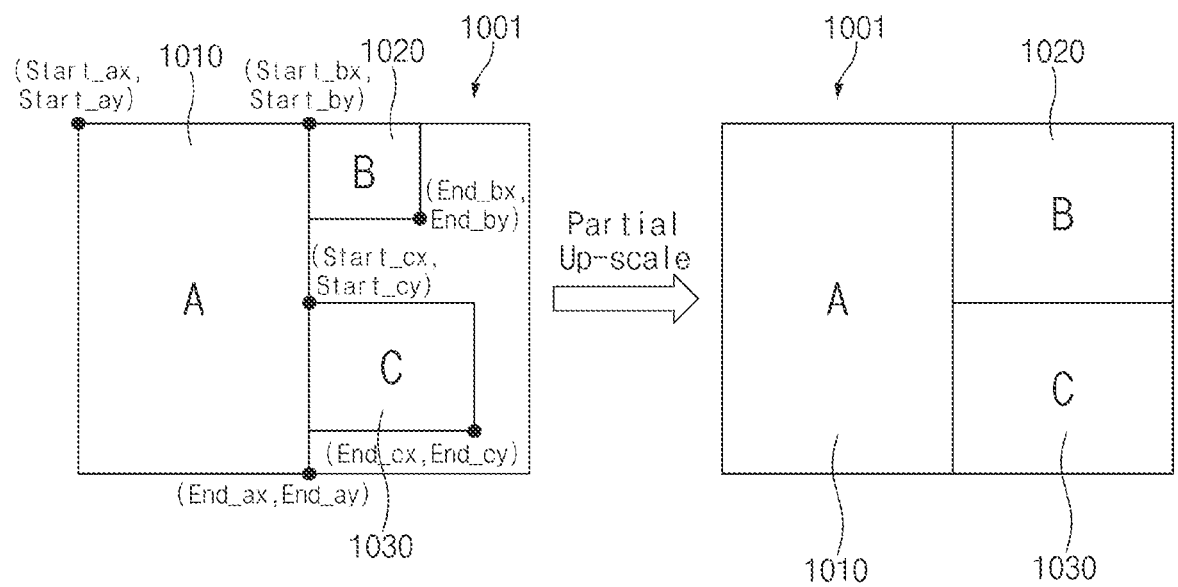
FIGS. 10A and 10B are diagrams illustrating an example operation of an electronic device, according to various embodiments.
Figure 10B:
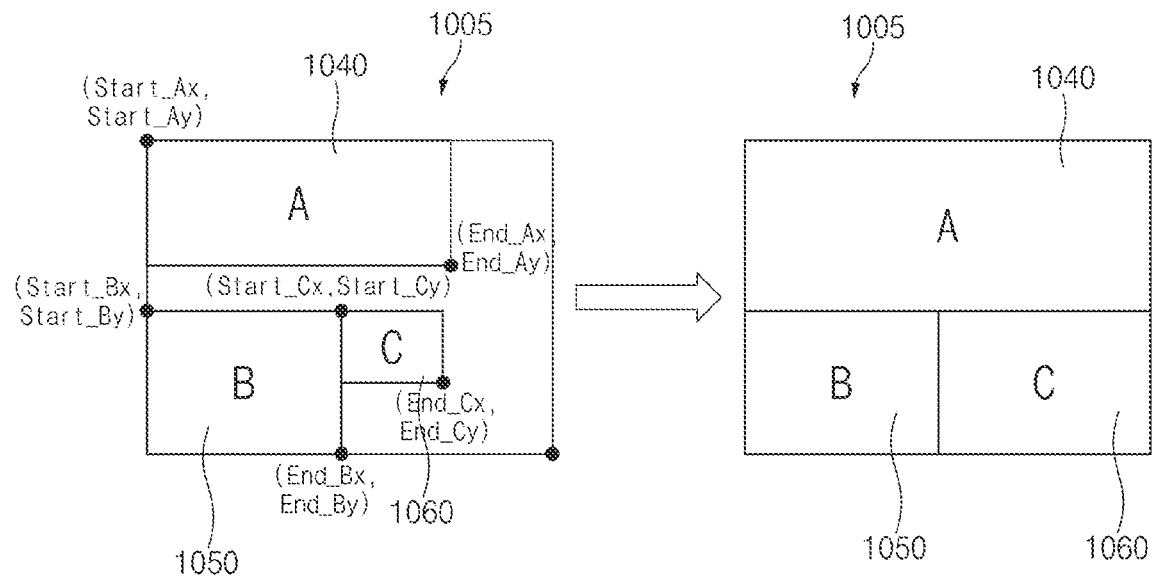

FIGS. 10A and 10B are diagrams illustrating an example operation of an electronic device, according to various embodiments.

According to an embodiment, the electronic device (e.g., the electronic device 101 of FIG. 1, the electronic device 200 of FIG. 2, or the electronic device 300 of FIG. 3) may up-scale at least a portion (at least one of regions 1010, 1020, 1030, 1040, 1050, or 1060 included in the frame images 1001 and 1005) of frame images 1001 and 1005, based on at least a portion of coordinate information of the frame images 1001 and 1005 or coordinate information of each of regions 1010, 1020, 1030, 1040, 1050, 1050, and 1060 corresponding to the execution screen of the application included in the frame images 1001 and 1005. For example, the electronic device may determine whether to up-scale each of the regions 1010, 1020. 1030, 1040, 1050, and 1060, based on coordinate information of the frame images 1001 and 1005 and coordinate information of each of the regions 1010, 1020. 1030, 1040, 1050, and 1060 corresponding to the execution screen of the application included in the frame images 1001 and 1005.

For example, the coordinate information of the frame images 1001 and 1005 may correspond to the display (e.g., the entire portion of the screen display region of the display) of the electronic device. For example, when end coordinate information of each of regions 1010, 1020, 1030, 1040, 1050, and 1060 included in the frame images 1001 and 1005 is identical to or meets start coordinate information of another image, or corresponds to the information (e.g., the size of the display−1) of the frame images 1001 and 1005, the electronic device does not perform an up-scaling operation, and may perform the up-scaling operation otherwise.

For example, as illustrated in FIG. 10A, it is assumed that the first frame image 1001 (e.g., the display) has the start coordinate information (0,0) and the end coordinate information (Full_x, Full_y), the first region 1010 corresponding to the "A" application has the start coordinate information (Start_ax, Start_ay), and the end coordinate information (End_ax, End_ay), the second region 1020 corresponding to the "B" application has the start coordinate information (Start_bx, Start_by) and the end coordinate information (End_bx, End_by), and the third region 1030 corresponding to the "C" application has the start coordinate information (Start_cx, Start_cy) and the end coordinate information (End_cx, End_cy). For example, regarding the first region 1010, "End_ax" may be equal to "Start_bx" (e.g., when End_ax=Start_bx), "End_ax" may meet "Start_bx" (e.g., when End_ax=Start_bx−1), and End_ay=Full_y may be accomplished. In this case, the electronic device may determine that the first region 1010 does not need to be up-scaled. For example, the electronic device may not up-scale the first region 1010. For example, regarding the second image 1020, "End_bx" may be different from "Full_x", "End_by" may be different from "Start_Cy", and "End_by" may not adjacent to "Start_Cy". In this case, the electronic device may determine that the second region 1020 needs to be up-scaled. For example, the electronic device may up-scale the second region 1020 to the region corresponding to the coordinate information of (Full_x, Start_Cy). For example, regarding the third region 1030, "End_cx" may differ from "Full_x", and "End_cy" may differ from "Full_y". In this case, the electronic device may determine that the third region 1030 needs to be up-scaled. For example, the electronic device may up-scale the third region 1030 to the region corresponding to the coordinate information (Full_x, Full_y).

Similarly, in FIG. 10B, it is assumed that the second frame image 1005 (e.g., the display) has the start coordinate information (0,0) and the end coordinate information (Full_x, Full_y), the fourth region 1040 corresponding to the "A" application has the start coordinate information (Start_Ax, Start_Ay), and the end coordinate information (End_Ax, End_Ay), the fifth region 1050 corresponding to the "B" application has the start coordinate information (Start_Bx, Start_By) and the end coordinate information (End_Bx, End_By), and the sixth region 1060 corresponding to the "C" application has the start coordinate information (Start_Cx, Start_Cy) and the end coordinate information (End_Cx, End_Cy). For example, regarding the fourth region 1040, "End_Ax" may differ from "Full_x", "End_Ay" may differ from "Start_By" or "Start_Cy" and may not be adjacent to "Start_By" or "Start_Cy". In this case, the electronic device may determine that the fourth region 1040 needs to be up-scaled. For example, the electronic device may up-scale the fourth region 1040 (Full_x, Start_By=Start_Cy (or, Start_By−1=Start_Cy−1)) to the region corresponding to the coordinate information. For example, regarding the fifth region 1050, "End_Bx" may be equal to "Start_Cx" (e.g., when "End_Bx"="Start_Cx") or may be adjacent to "Start_Cx" (e.g., when End_Bx=Start_Cx−1), and End_By may be Full_y. In this case, the electronic device may determine that the fifth region 1050 does not need to be up-scaled. For example, the electronic device may not up-scale the fifth region 1050. For example, regarding the sixth region 1060, "End_cx" may differ from "Full_x", and "End_cy" may differ from "Full_y". In this case, the electronic device may determine that the sixth region 1060 needs to be up-scaled. For example, the electronic device may up-scale the sixth region 1060 to the region corresponding to the coordinate information of (Full_x, Full_y).

According to an example embodiment of the disclosure, an electronic device may include: a display panel, a display driving circuit, and at least one processor operatively connected to the display driving circuit. The at least one processor may be configured to: determine a resolution of each of a plurality of applications, generate an execution screen for each of the plurality of applications, based at least partially on the resolution of each of the plurality of applications and information on a display region corresponding to the execution screen of each of the plurality of applications on the display panel, generate a frame image including regions corresponding to the determined resolution, and transmit the frame image and coordinate information of each of the regions included in the frame image to the display driving circuit. The display driving circuit may be configured to: up-scale at least a portion, having a resolution lower than a resolution of the display panel, of the regions included in the frame image, based on the frame image and the coordinate information of each of the regions, such that the frame image has a resolution corresponding to the resolution of the display panel, and control the display panel to display the execution screen of each of the plurality of applications based on the up-scaled frame image.

According to an example embodiment, the display driving circuit may include a scaler comprising circuitry configured to up-scale at least a portion of the frame image in hardware.

According to an example embodiment, the at least one processor may be configured to determine the resolution of each of the plurality of applications, based at least partially on the relevant type of each of the plurality of applications.

According to an example embodiment, the at least one processor may be configured to determine the resolution of each of the application, based at least partially on the region, occupied by the execution screen of each of the plurality of applications, in the entire portion of the screen display region of the display panel.

According to an example embodiment, the at least one processor may be configured to: control the display panel to provide a user interface for setting resolution of at least one of the plurality of applications through the display driving circuit, and determine the resolution of the at least one application, based on an input received through the user interface.

According to an example embodiment, the at least one processor may be configured to determine the resolution of each of the plurality of applications, based on information on resolution set when each of the plurality of applications is previously executed.

According to an example embodiment, the at least one processor may be configured to perform an operation of determining the resolutions, in response to a user input for providing a multi-window screen including execution screens of the plurality of applications.

According to an example embodiment, the user input may include a user input for additionally executing a second application while displaying an execution screen of a first application through the display panel.

According to an example embodiment, the at least one processor may be configured to: control the display panel to provide a user interface for setting resolution of the second application through the display driving circuit, and determine the resolution of the second application while maintaining the state of the execution screen of the first application, based on a user input received through the user interface.

According to an example embodiment, the display panel may include a flexible display panel configured to expand or contact the screen display region, and the at least one processor may be configured to: determine the resolution for the application displayed on the expanded screen display region to be lower than the resolution of the display panel, based on a screen display region contracted being switched to the screen display region expanded in the display panel.

According to an example embodiment, the at least one processor may be configured to: receive a user input for selecting at least one application of the plurality of applications, while executing the plurality of applications, and control the display driving circuit such that the display panel provides a user interface to set the resolution of the selected at least one application, and change the resolution set for the selected at least one application, based on the user input received through the user interface.

According to an example embodiment, the plurality of applications may include a first application and a second application, and the at least one processor may be configured to: determine the resolution of the first application to be a first resolution corresponding to the resolution of the display panel, determine the resolution of the second application to be a second resolution lower than the first resolution, generate the frame image including a first region corresponding to the first execution screen of the first application and a second region corresponding to the second execution screen of the second application, and transmit at least a portion of the frame image, information on the size of the frame image, the coordinate information of the first region, or the coordinate information of the second region, to the display driving circuit. The display driving circuit may be configured to up-scale the second region of the frame image, based on the at least a portion of the frame image, the information on the size of the frame image, the coordinate information of the first region, or the coordinate information of the second region, and control the display panel to display the execution screen of each of the plurality of applications, based on the up-scaled frame image of the second region.

According to an example embodiment, the at least one processor may be configured to generate the frame image such that the first region corresponding to the execution screen is provided at a position corresponding to the first display region of the frame image, and the second region corresponding to the second execution screen is provided at a position corresponding to the second display region in the frame image, based on the information on the first display region for displaying the first execution screen of the first application and information on the second display region for displaying the second execution screen of the second application on the display panel.

According to an example embodiment, the execution screen of each of the plurality of applications may include a first execution screen of the first application and a second execution screen of the second application, and the at least one processor may be configured to: receive a user input for switching a position for displaying the first execution screen and a position for displaying the second execution screen with each other, set the resolution for the first application and the resolution for the second application by switching first resolution set for the first application and second resolution set for the second application to each other, in response to the user input for switching the display positions to each other, and set coordinate information of a first region, included in the frame image, corresponding to the first execution screen and coordinate information of a second region, included in the frame image, corresponding to the second execution screen, by switching the coordinate information of the first region and the coordinate information of the second region to each other.

According to an example embodiment, an execution screen of each of the plurality of applications may include a first execution screen of a first application and a second execution screen of a second application, and the at least one processor may be configured to: receive a user input for switching the display position of the first execution screen and the display position of the second execution screen to each other, change the coordinate information of the first region, included in the frame image, corresponding to the first execution screen and the coordinate information of the second region, included in the frame image, corresponding to the second execution screen, while maintaining the first resolution set for the first application and the second resolution set for the second application, in response to the user input for switching the display positions to each other.

According to an example embodiment, the at least one processor may be configured to transmit information on the size of the frame image to the display driving circuit.

According to an example embodiment, the at least one processor may be configured to determine whether to up-scale each of the regions, based on at least a portion of the information on the size of the frame image or the coordinate information of each of the regions.

Figure 11:
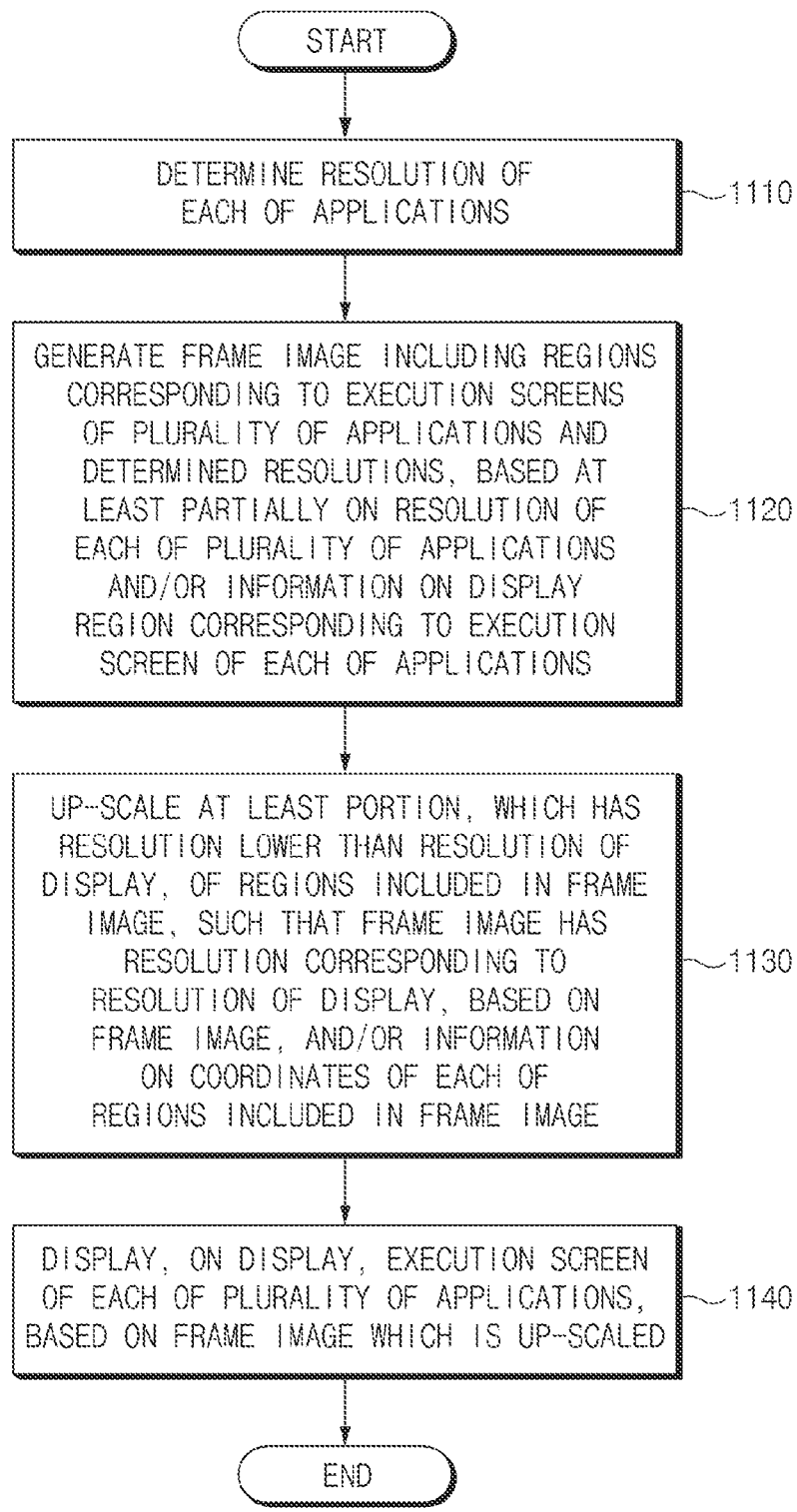
FIG. 11 is a flowchart illustrating an example method for controlling a display of an electronic device, according to various embodiments.

FIG. 11 is a flowchart illustrating an example method for controlling a display of an electronic device, according to various embodiments. For example, the operations of FIG. 11 may be performed by a processor (e.g., the processor 120 of FIG. 1 or the processor 230 of FIG. 2) of an electronic device (e.g., the electronic device 101 of FIG. 1, the electronic device 200 of FIG. 2, or the electronic device 300 of FIG. 3) and/or the display driving circuit (e.g., the display driving circuit 220 of FIG. 2).

According to an embodiment, in operation 1110, the electronic device may determine the resolution of each of a plurality of applications. According to an embodiment, the electronic device may determine the resolution of each of the plurality of applications, based on each type of the plurality of applications. For example, the electronic device may determine the resolution for each application to be the higher resolution or the lower resolution. For example, the higher resolution may refer to the resolution equal to or greater than a reference resolution (e.g., the resolution of the display) for determining whether to perform an up-scaling operation, and the lower resolution may refer to the resolution less than the reference resolution. For example, the electronic device may determine, to the higher resolution, the resolution of an application, which needs to be displayed on the display with the higher image quality, in which the application includes an application (e.g., a document application) in a type requiring higher readability due to a large number of texts provided in an execution screen, or an application (e.g., a gallery application, a video application, and an SNS application) in a type requiring higher visibility. For example, the electronic device may determine, to the lower resolution, the resolution of an application (e.g., a health application, a financial or bank application, a navigation application, and a music applications) in a type, in which image quality (resolution) displayed on the display is relatively less important. For example, when determining the resolution of a high-performance application (e.g., a high-performance game application) to the higher resolution and when multi-tasking the plurality of applications, the electronic device may determine the resolution of the high-performance application to the lower resolution if necessary, because the multi-tasking may not be smoothly performed due to insufficient resources of the electronic device 200. For example, the electronic device may determine the resolution of each application, based on at least a portion of a region, which is occupied by the execution screen of each application, in the entire screen display region of the display. For example, when the execution screen of the application occupies a specific proportion (e.g., 50%) of the entire screen display region, the electronic device may determine the resolution for the application to be higher resolution. For example, the electronic device may provide a user interface for setting the resolution of an application, which is being executed, or an application to be executed, and may determine the resolution for the application, based on an input received through the user interface. For example, the electronic device may determine the resolution for the application, based on information on the resolution set when the application was previously executed. For example, the manifest of the application may store the information on the resolution set when the application is previously executed. For example, the electronic device may determine the resolution of an application, based on the information stored in the manifest of an application.

According to an embodiment, the electronic device may perform operation 1110 in response to a user input for providing a multi-window screen including execution screens of a plurality of applications. For example, the user input may include a user input for additionally executing one application while executing another application.

According to an embodiment, in operation 1120, the electronic device may generate a frame image including regions corresponding to execution screens of a plurality of applications and regions corresponding to resolutions (e.g., the resolution determined in operation 1110) of the plurality of applications, based at least partially on the resolutions of the plurality of application and/or information on the display region corresponding to the execution screen of each application. For example, the frame image may correspond to the entire portion of the screen display region to be displayed on the display. For example, the electronic device may generate (render) a region corresponding to the execution screen of each application. For example, the electronic device may generate a region corresponding to the execution screen of the application determined to have the higher resolution to correspond to the size of the execution screen to be displayed on the display and/or the resolution of the display. For example, the electronic device may generate the region, which corresponds to the execution screen of the application, determined to have the higher resolution in size smaller than the size of the execution screen to be displayed on the display or to have the resolution lower than the resolution of the display.

For example, the electronic device may generate the frame image by merging or compositing regions corresponding to the execution screens of the plurality of applications. For example, the electronic device may store the frame image in the frame buffer.

According to an embodiment, in operation 1130, the electronic device may up-scale at least a portion of regions included in the frame image, such that the frame image has the resolution corresponding to the resolution of the display, based on at least a portion of the frame image, information on the size of the frame image, and/or information on coordinates of each of the regions included in the frame image. For example, the information on the size of the frame image may include start coordinate information and end coordinate information of the frame image. For example, the coordinate information of each of the regions may include the start coordinate information and the end coordinate information of each of the regions. For example, the electronic device may up-scale at least one of the regions included in the frame image through the scaler included in the display driving circuit. For example, the electronic device may selectively up-scale a portion (e.g., at least one of regions included in the frame image) of the frame image, instead of collectively up-scaling the entire portion of the frame image.

According to an embodiment, in operation 1140, the electronic device may display, on the display, the execution screen of each of the plurality of applications, based on the frame image which is at least partially up-scaled.

Figure 12:
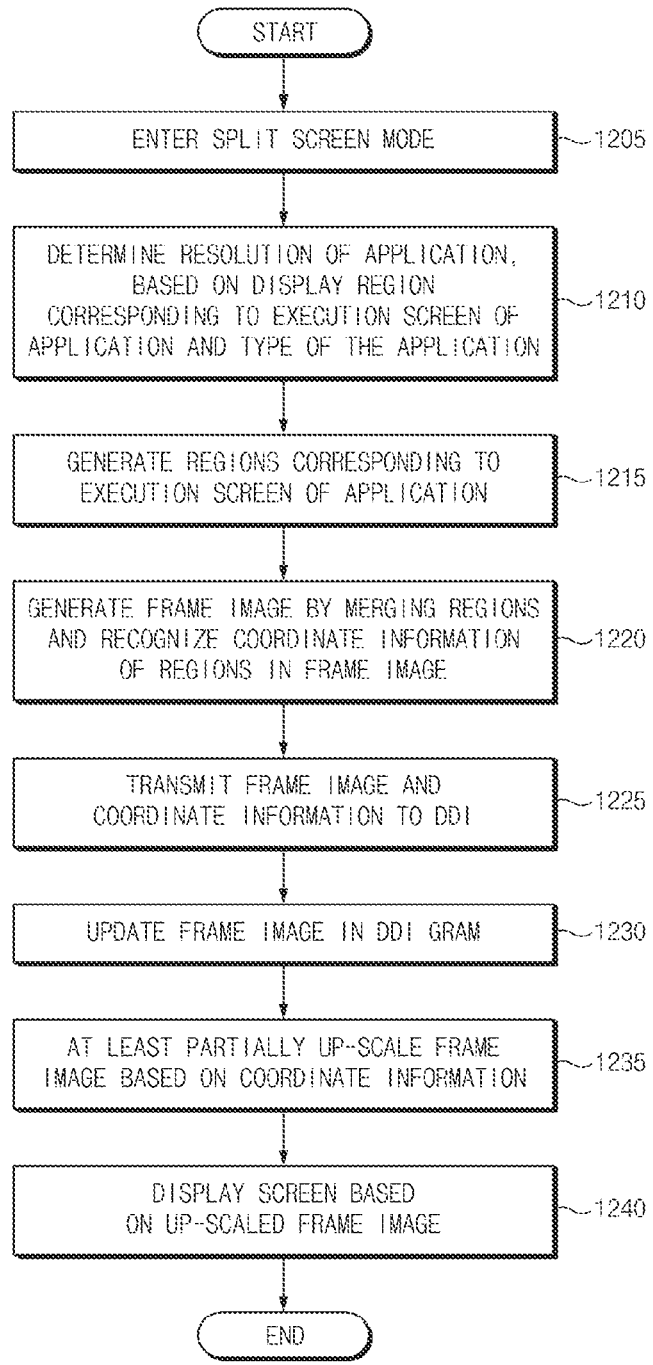
FIG. 12 is a flowchart illustrating an example method for controlling a display of an electronic device, according to various embodiments.

FIG. 12 is a flowchart illustrating an example method for controlling a display of an electronic device, according to various embodiments. Hereinafter, the duplication of the description made with reference to FIG. 11 may not be repeated or may be described in brief. For example, the operations of FIG. 12 may be performed by a processor (e.g., the processor 120 of FIG. 1 or the processor 230 of FIG. 2) of an electronic device (e.g., the electronic device 101 of FIG. 1, the electronic device 200 of FIG. 2, or the electronic device 300 of FIG. 3) and/or the display driving circuit (e.g., the display driving circuit 220 of FIG. 2).

According to an embodiment, in operation 1205, the electronic device (e.g., the processor) may enter into a split screen mode (e.g., a multi-window screen mode). For example, the electronic device may enter into the split screen mode, in response to a user input for executing the second application while the execution screen of the first application is displayed in the form of the full screen. For example, the electronic device may split the screen of the display to simultaneously display the execution screen of the first application and the execution screen of the second application. For example, when the electronic device includes the flexible display to expand or contract the screen display region, the electronic device may provide at least a portion of the expanded screen display region in the form of a split screen, as the screen display region of the flexible display is expanded.

According to an embodiment, in operation 1210, the electronic device (e.g., a processor) may determine the resolution for the application, based on the display region corresponding to the execution screen of the application in the display and the type of the application. For example, the electronic device may determine the resolution for the application in a specific type requiring higher readability or higher visibility to be the higher resolution, and may determine, to the lower resolution, the resolution for the application in types other than the specified type. For example, when the execution screen of each application occupies at a specified proportion (e.g., 50%) or more in the entire screen display region of the display, the electronic device may determine the resolution of the relevant application to the higher resolution. For example, the electronic device may provide a user interface for setting the resolution of an application, which is being executed, or which is to be executed, and may determine the resolution for the application based on the input received through the user interface. For example, the electronic device may determine the resolution for the application based on the resolution information set when the application is previously executed.

According to an embodiment, in operation 1215, the electronic device (e.g., the processor) may generate regions corresponding to the execution screen of the application. For example, the electronic device may generate or draw regions (e.g., the image or the view corresponding the execution screen) corresponding to the execution screen of each application, based on the determined resolution.

According to an embodiment, in operation 1220, the electronic device (e.g., the processor) may generate a frame image by merging the regions and may recognize the coordinate information of the regions included in the frame image. For example, the electronic device may store, in the frame buffer, the frame image generated by merging or compositing the regions. For example, the electronic device may recognize the start coordinate information and the end coordinate information of the frame image, and the start coordinate information and the end coordinate information of each of regions in the frame image.

According to an embodiment, in operation 1225, the electronic device (e.g., the processor) may transmit, to the display driving circuit (e.g., the DDI), the frame image and the coordinate information. For example, the electronic device (e.g., the processor) may transmit at least some of the frame image, information on the size of the frame image, and/or coordinate information of each region included in the frame image to the display driving circuit.

According to an embodiment, operation 1205 to operation 1225 may be performed by the processor of the electronic device.

According to an embodiment, in operation 1230, the electronic device (e.g., the display driving circuit) may update the frame image into the graphic memory (e.g., the GRAM) of the display driving circuit. For example, the display driving circuit of the electronic device may update the frame image, which received from the processor in operation 1225, in the graphic memory.

According to an embodiment, in operation 1235, the electronic device (e.g., the display driving circuit) may at least partially up-scale the frame image, based on the coordinate information. For example, the electronic device may up-scale at least one of the image having the lower resolution which are included in the frame image. For example, the operation of partially up-scaling the frame image using the coordinate information has been described above with reference to FIGS. 9A, 9B, 9C, 10A and 10B, so the duplication thereof may not be repeated.

According to an embodiment, in operation 1240, the electronic device (e.g., the display driving circuit) may display the screen on the display, based on the frame image at least partially up-scaled. For example, the electronic device may display the execution screen of the application in each split screen of the display, based on the frame image at least partially up-scaled.

According to an embodiment, operation 1230 to operation 1240 may be performed by the display driving circuit of the electronic device.

According to an embodiment, the electronic device may selectively adjust the necessary resolution for the application by partially up-scaling the frame image, instead of collectively up-scaling the frame image. According to an embodiment, the electronic device may generate the region, which corresponds to the execution screen of the application requiring the higher resolution, to have the higher resolution, based on the application type or the display region corresponding to the execution screen, instead of generating, to the higher resolution, the regions corresponding to the execution screens of the all applications in the frame image. In addition, the electronic device at least partially up-scales and uses the frame image, after generating the region corresponding to the execution screen of the application, which does not require the higher resolution, to have the lower resolution. Accordingly, the display is controlled with the lower power, as compared with the case that the entire portion (e.g., all regions included in the frame image) of the frame image is generated to have the higher resolution, and the image quality (the resolution) of the screen displayed on the display may be more improved, as compared with the case that the entire portion of the frame image is generated to have the lower resolution.

Figure 13:
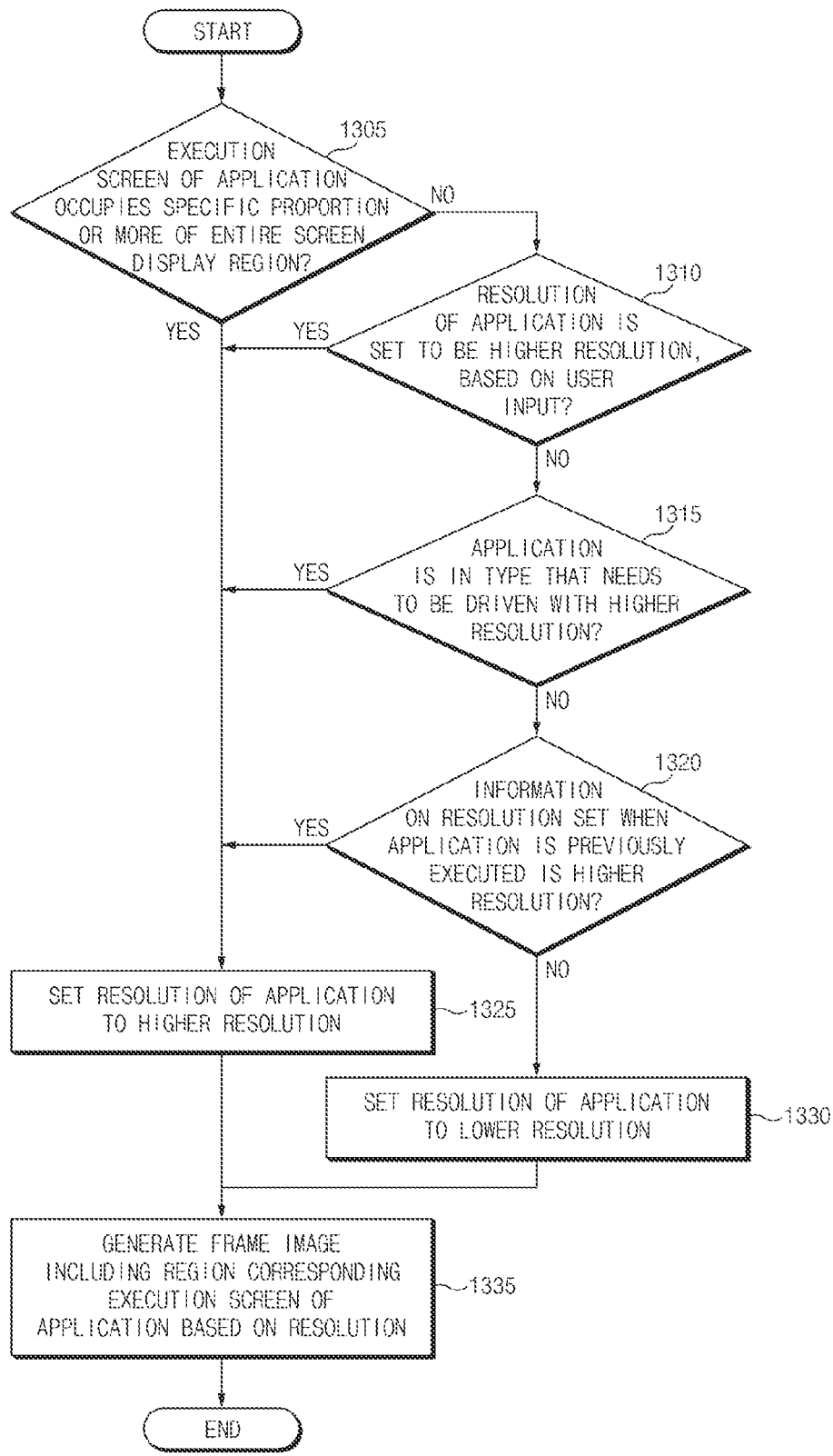
FIG. 13 is a flowchart illustrating an example operation of generating an image corresponding to an execution screen of an electronic device, according to various embodiments.

FIG. 13 is a flowchart illustrating an example operation of generating an image corresponding to the execution screen of an electronic device, according to various embodiments. Hereinafter, the duplication of the description made with reference to FIGS. 11 and 12 may not be repeated or may be described in brief. For example, the operations of FIG. 13 may be performed by a processor (e.g., the processor 120 of FIG. 1 or the processor 230 of FIG. 2) of an electronic device (e.g., the electronic device 101 of FIG. 1, the electronic device 200 of FIG. 2, or the electronic device 300 of FIG. 3).

According to an embodiment, in operation 1305, the electronic device may determine whether the execution screen of the application occupies a specific proportion or more of the entire portion of the screen display region. For example, the specific proportion may be preset or may be set through a user input. For example, when the execution screen of the application occupies the specific proportion or more of the entire portion of the screen display region (operation 1305—YES), the electronic device may perform operation 1325. When the execution screen of the application occupies less than the specific proportion of the entire portion of the screen display region (operation 1305—NO), the electronic device may perform operation 1310.

According to an embodiment, in operation 1310, the electronic device may determine whether to set the resolution for the application to the higher resolution, based on the user input. For example, the electronic device may provide a user interface for setting the resolution of an application, which is being executed, or which is to be executed, and may receive a user input for determining the resolution for the application through the user interface. For example, the electronic device may perform operation 1325, when the resolution for the application is set to the higher resolution in response to the user input (operation 1310—YES), and may perform operation 1315, when the resolution for the application is set to the lower resolution (operation 1310—NO).

According to an embodiment, in operation 1315, the electronic device may determine whether an application is the type needs to be driven with the higher resolution. For example, the application requiring higher visibility or higher readability may be in the type that needs to be driven with the higher resolution. The application not requiring higher visibility or higher readability may be in a specific type that needs not to be driven with the higher resolution. For example, the electronic device may set the application that needs to be driven with the higher resolution in a specific type in advance, or by a user. For example, when the application may be in the type that needs to be driven with the higher resolution (operation 1315—YES), the electronic device may perform operation 1325. When the application is not in a specific type that needs to be driven with the higher resolution (operation 1310—NO), the electronic device may perform operation 1320.

According to an embodiment, in operation 1320, the electronic device may determine whether the information on the set resolution is the higher resolution, when the application is previously executed. For example, when the application is previously executed, the information on the set resolution may be stored in the manifest of the application. For example, when the application is previously executed, the electronic device may determine whether the set resolution information is the higher resolution, based on the information stored in the manifest of the application. For example, when the application is previously executed, and when the information on the set resolution indicates the higher resolution (operation 1320—YES), the electronic device performs operation 1325. When the information on the preset resolution indicates the lower resolution (operation 1320—NO), the electronic device may perform operation 1330.

According to an embodiment, the sequence of operation 1305 to 1320 may be changed or some operations may be omitted.

According to an embodiment, in operation 1325, the electronic device may determine the resolution for the application to the higher resolution. For example, the higher resolution may refer to the resolution corresponding to the resolution (e.g., the resolution of the display) of the execution screen of the application to be displayed on the display. For example, the higher resolution may refer to the resolution having a reference resolution value (e.g., the resolution of the display) or more for determining whether to up-scale a region corresponding to the execution screen of the application included in the frame image.

According to an embodiment, in operation 1330, the electronic device may set the resolution for the application to the lower resolution. For example, a specified lower resolution may refer to the lower resolution than the resolution of the execution screen of the application to be displayed on the display (e.g., the resolution of the display). For example, the lower resolution may refer to the resolution having less than a reference resolution value (e.g., the resolution of the display) for determining whether to up-scale a region corresponding to the execution screen of the application included in the frame image.

According to an embodiment, in operation 1335, the electronic device may generate the frame image including the region (e.g., image data or view corresponding to the execution screen) corresponding to the execution screen of the application, based on the determined (set) resolution. For example, the electronic device may generate the frame image including the plurality of regions corresponding to the execution screen of each of a plurality of applications.

Figure 14:
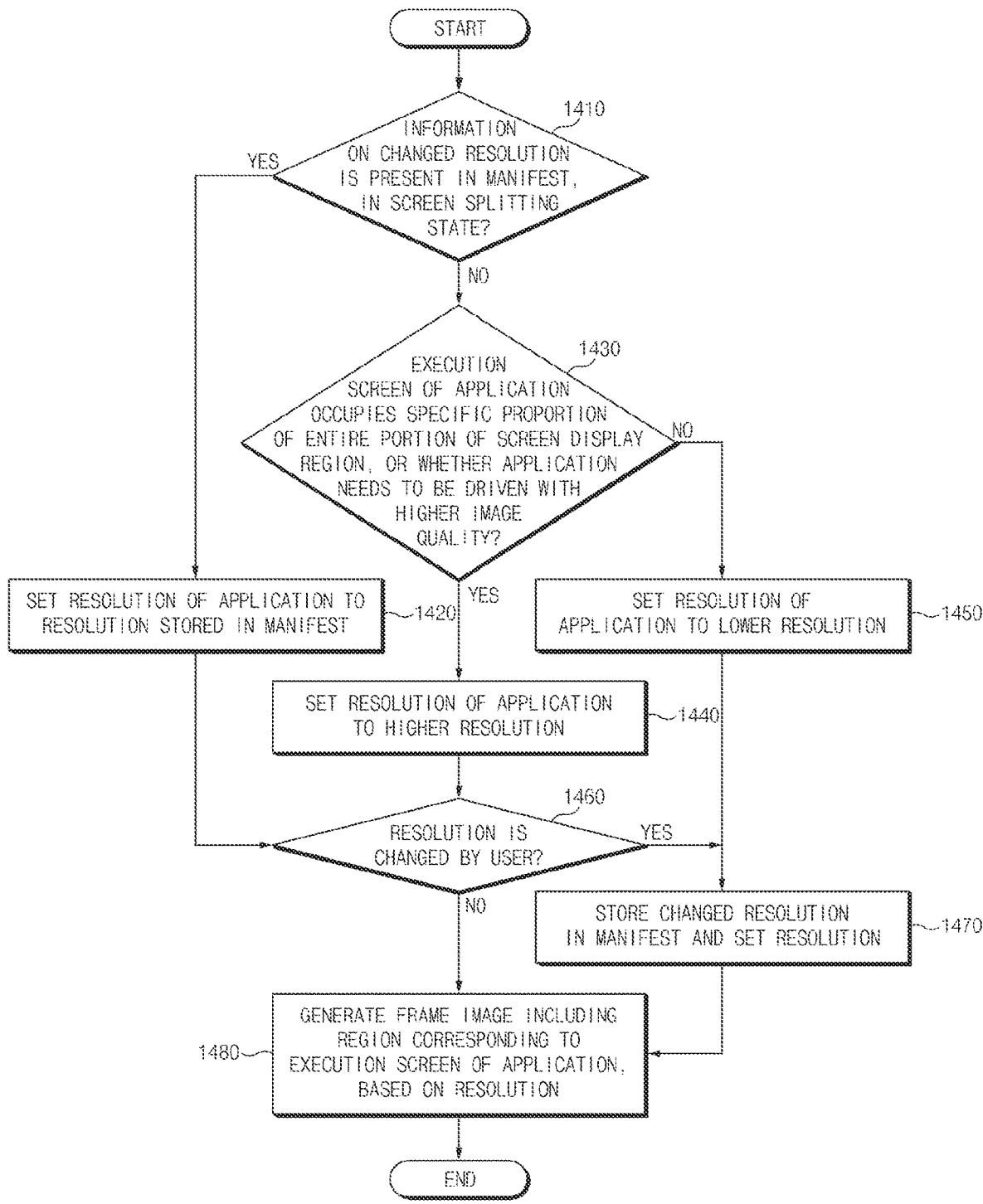
FIG. 14 is a flowchart illustrating an example operation of generating an image corresponding to an execution screen of an electronic device, according to various embodiments.

FIG. 14 is a flowchart illustrating an example operation of generating an image corresponding to the execution screen of an electronic device, according to various embodiments. Hereinafter, the duplication of the description made with reference to FIG. 11 may not be repeated or may be described in brief. For example, the operations of FIG. 14 may be performed by a processor (e.g., the processor 120 of FIG. 1 or the processor 230 of FIG. 2) of an electronic device (e.g., the electronic device 101 of FIG. 1, the electronic device 200 of FIG. 2, or the electronic device 300 of FIG. 3).

According to an embodiment, in operation 1410, the electronic device may determine whether information on the changed resolution may be present in the manifest of the application, in a screen splitting state. For example, the screen splitting state may refer to a state in which the screen of the display is split, such that the execution screens of the plurality of applications are simultaneously displayed. For example, the manifest of the application may store information on the resolution set when the application is previously executed. For example, when the information on the changed resolution is in the manifest of the application, and when the application is previously executed, the information on the resolution set by the electronic device or the user may be present. For example, when the information on the changed resolution is present in the manifest (operation 1410—YES), the electronic device may perform operation 1420. For example, when the information on the changed resolution is absent in the manifest (operation 1410—NO), the electronic device may perform operation 1430.

According to an embodiment, in operation 1420, the electronic device may set the resolution for the application to the resolution stored in the manifest. For example, the electronic device may set the resolution for the application to the resolution, which is set when the application is previously performed, based on the information on the resolution stored in the manifest.

According to an embodiment, in operation 1430, the electronic device may determine whether the execution screen of the application occupies a specific proportion of the entire portion of the screen display region, or whether the application needs to be driven with higher image quality. For example, the electronic device may perform operation 1440, when the execution screen of the application occupies the specific proportion of the entire portion of the display region, or the application needs to be driven with the higher quality (operation 1430—YES). Otherwise, the electronic device may perform operation 1450 (operation 1410—NO).

According to an embodiment, in operation 1440, the electronic device may set the resolution for the application to the higher resolution. For example, the higher resolution may refer to the resolution having a reference resolution value (e.g., the resolution of the display) or more for determining whether to up-scale a region corresponding to the execution screen of the application.

According to an embodiment, in operation 1450, the electronic device may set the resolution for the application to the lower resolution. For example, the lower resolution may refer to the resolution having less than a reference resolution value (e.g., the resolution of the display) for determining whether to up-scale a region corresponding to the execution screen of the application.

According to an embodiment, in operation 1460, the electronic device may determine whether the resolution is changed by a user. For example, the electronic device may provide a user interface for receiving the user input for changing the resolution, and may receive the user input through the user interface. For example, the electronic device may determine whether the resolution set in operation 1420, operation 1440, or operation 1450 is changed. For example, the electronic device may perform operation 1470 when the resolution is changed by the user (operation 1460—YES), and may perform operation 1480 when the resolution is not changed by the user (operation 1460—NO).

According to an embodiment, in operation 1470, the electronic device may store information on the resolution, which is changed by the user, in the manifest, and may set the resolution for the application to the resolution changed by the user.

According to an embodiment, in operation 1480, the electronic device may generate the frame image including a region corresponding to the execution screen of the application, based on the set resolution.

According to an example embodiment, a method for controlling a display of an electronic device, may include: determining a resolution of each of a plurality of applications, generating a frame image including regions corresponding to an execution screen of each of the plurality of applications and the determined resolution of the plurality of applications, based at least partially on the resolution of each of the plurality of applications and information on the display region corresponding to the execution screen of each of the plurality of applications on the display, up-scaling at least a portion, having a resolution lower than the resolution of the display, of the regions included in the frame image, based on the frame image and coordinate information of each of the regions included in the frame image, such that the frame image has a resolution corresponding to the display, and displaying, on the display, the execution screen of each of the plurality of applications, based on the up-scaled frame image.

According to an example embodiment, the plurality of applications may include a first application and a second application, and the determining of the resolution may include determining resolution of the first application to first resolution corresponding to the resolution of the display, and determining the resolution of the second application to second resolution lower than the first resolution.

According to an example embodiment, the generating of the frame image may include generating the frame image including a first region corresponding to a first execution screen of the first application and a second region corresponding to a second execution screen of the second application.

According to an example embodiment, the generating of the frame image may include generating the frame image such that the first region corresponding to the execution screen is provided at a position corresponding to the first display region of the frame image, and the second region corresponding to the second execution screen is provided at a position corresponding to the second display region in the frame image, based on the information on the first display region for displaying the first execution screen of the first application and information on the second display region for displaying the second execution screen of the second application on the display.

According to an example embodiment, the determining of the resolution may include determining the resolution of each of the application, based at least partially on the region, occupied by the execution screen of each of the plurality of applications, in the entire portion of the screen display region of the display.

According to an example embodiment, the determining of the resolution may include providing a user interface for setting resolution of at least one of the plurality of applications and determining the resolution of the at least one application, based on an input received through the user interface.

According to an example embodiment, the determining of the resolution may include determining the resolution of each of the plurality of applications, based on set resolution information, based on each of the plurality of applications being previously executed.

According to an example embodiment, the execution screen of each of the plurality of applications may include a first execution screen of a first application and a second execution screen of a second application, and the method may include: receiving a user input for switching the display position of the first execution screen and the display position of the second execution screen to each other, and setting a resolution for the first application and a resolution for the second application by switching first resolution set for the first application and second resolution set for the second application to each other, in response to the user input for switching the display positions to each other, and setting coordinate information of a first region, included in the frame image, corresponding to the first execution screen and coordinate information of a second region, included in the frame image, corresponding to the second execution screen, such that the coordinate information of the first region is set for the second region, and the coordinate information of the second region is set for the first region, in response to the user input for switching the display positions to each other.

According to an example embodiment, the execution screen of each of the plurality of applications may include a first execution screen of a first application and a second execution screen of a second application, and the method may further include: receiving a user input for switching the display position of the first execution screen and the display position of the second execution screen to each other, and changing the coordinate information of the first region, which is included in the frame image, corresponding to the first execution screen and the coordinate information of the second region, which is included in the frame image, corresponding to the second execution screen, while maintaining the first resolution set for the first application and the second resolution set for the second application, in response to the user input for switching the display positions to each other.

According to an example embodiment, the up-scaling may include determining whether to up-scale each of the regions, based on at least a portion of the information on the size of the frame image or the coordinate information of each of the regions.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display panel;
a display driving circuit; and
at least one processor operatively connected to the display driving circuit,
wherein the at least one processor is configured to:
determine a resolution of each of a plurality of applications, the plurality of applications including a first application and a second application, including determine a resolution of the first application to be a first resolution corresponding to the resolution of the display panel and determine a resolution of the second application to be a second resolution lower than the first resolution;

generate a frame image including regions corresponding to execution screens of the plurality of applications and determined resolutions of the plurality of applications, based at least partially on the resolutions of the plurality of applications and/or information on a display region corresponding to the execution screens of the plurality of applications on the display panel, the frame image including a first region corresponding to a first execution screen of the first application and a second region corresponding to a second execution screen of the second application; and transmit, to the display driving circuit, at least a portion of the frame image, information on a size of the frame image, coordinate information of the first region, or coordinate information of the second region, and wherein the display driving circuit is configured to:

up-scale the second region of the frame image, based on the at least a portion of the frame image, the information on the size of the frame image, the coordinate information of the first region, or the coordinate information of the second region, such that the frame image has a resolution corresponding to the resolution of the display panel; and control the display panel to display the execution screen of each of the plurality of applications, based on the up-scaled frame image of the second region.

2. The electronic device of claim 1, wherein the display driving circuit further includes:

a scaler comprising circuitry configured to up-scale at least a portion of the frame image in hardware.

3. The electronic device of claim 1, wherein the at least one processor is configured to:

determine the resolution of each of the plurality of applications, based at least partially on a relevant type of each of the plurality of applications.

4. The electronic device of claim 1, wherein the at least one processor is configured to:

determine the resolution of each of the plurality of applications, based at least partially on a region, occupied by the execution screen of each of the plurality of applications, in an entire portion of a screen display region of the display panel.

5. The electronic device of claim 1, wherein the at least one processor is configured to:

control the display panel to provide a user interface for setting resolution of at least one of the plurality of applications through the display driving circuit; and determine the resolution of the at least one application, based on an input received through the user interface.

6. The electronic device of claim 1, wherein the at least one processor is configured to:

determine the resolution of each of the plurality of applications, based on information on a resolution set when each application is previously performed.

7. The electronic device of claim 1, wherein the at least one processor is configured to:

perform an operation of determining the resolutions, in response to receiving an input for providing a multi-window screen including the execution screens of the plurality of applications.

8. The electronic device of claim 7, wherein the user input includes:

an for additionally executing a second application while displaying an execution screen of a first application through the display panel.

9. The electronic device of claim 8, wherein the at least one processor is configured to:

control the display panel to provide a user interface for setting resolution of the second application through the display driving circuit; and determine the resolution of the second application while maintaining the first application being executed, based on an input received through the user interface.

10. The electronic device of claim 7, wherein the display panel includes a flexible display panel configured to expand or contract a screen display region, and wherein the at least one processor is configured to:

determine the resolution of an application displayed on a screen display region, expanded to be lower than resolution of the display panel, based on a screen display region contracted being switched to the screen display region expanded in the display panel.

11. The electronic device of claim 1, wherein the at least one processor is configured to:

receive an input for selecting at least one application of the plurality of applications, while executing the plurality of applications;

control the display driving circuit such that the display panel provides a user interface to set resolution of the selected at least one application; and change the resolution set for the selected at least one application, based on the input received through the user interface.

12. The electronic device of claim 1, wherein the at least one processor is configured to:

generate the frame image such that the first region corresponding to a first execution screen is provided at a position corresponding to a first display region of the frame image, and the second region corresponding to a second execution screen is provided at a position corresponding to a second display region in the frame image, based on information on the first display region for displaying the first execution screen of the first application and information on the second display region for displaying the second execution screen of the second application on the display panel.

13. The electronic device of claim 1, wherein the execution screen of each of the plurality of applications includes a first execution screen of a first application and a second execution screen of a second application, and wherein the at least one processor is configured to:

receive an input for switching a display position of the first execution screen and a display position of the second execution screen to each other; and set a resolution for the first application and a resolution for the second application, by switching the first resolution set for the first application and the second resolution set for the second application to each other, in response to the input for switching the display positions with each other, and set coordinate information of a first region, included in the frame image, corresponding to the first execution screen and coordinate information of a second region, included in the frame image, corresponding to the second execution screen, by switching the coordinate information of the first region and the coordinate information of the second region with each other, in response to the input for switching the display positions with each other.

14. The electronic device of claim 1, wherein the execution screen of each of the plurality of applications includes:

a first execution screen of a first application and a second execution screen of a second application, wherein the at least one processor is configured to:

receive an input for switching a display position of the first execution screen and a display position of the second execution screen to each other; and change coordinate information of a first region, included in the frame image, corresponding to the first execution screen and coordinate information of a second region, included in the frame image, corresponding to the second execution screen, while maintaining first resolution set for the first application and second resolution set for the second application, in response to the input for switching the display positions with each other.

15. The electronic device of claim 1, wherein the at least one processor is configured to:

transmit information on a size of the frame image to the display driving circuit.

16. The electronic device of claim 1, wherein the at least one processor is configured to:

determine whether to up-scale each of the regions, based on at least a portion of information on a size of the frame image or coordinate information of each of the regions.

17. A method for controlling a display panel of an electronic device including a display driving circuit and at least one processor operatively connected to the display driving circuit, the method comprising:

determining, by the at least one processor, a resolution of each of a plurality of applications, the plurality of applications including a first application and a second application, including determine a resolution of the first application to be a first resolution corresponding to the resolution of the display panel and determine a resolution of the second application to be a second resolution lower than the first resolution;

generating, by the at least one processor, a frame image including regions corresponding to execution screens of the plurality of applications and determined resolutions of the plurality applications, based at least partially on the resolutions of the plurality of applications and/or information on a display region corresponding to the execution screen of each of the plurality of applications on the display panel, the frame image including a first region corresponding to a first execution screen of the first application and a second region corresponding to a second execution screen of the second application;

transmitting, to the display driving circuit, at least a portion of the frame image, information on a size of the frame image, coordinate information of the first region, or coordinate information of the second region up-scaling, by the display driving circuit, the second region of the frame image, based on the at least a portion of the frame image, the information on the size of the frame image, the coordinate information of the first region, or the coordinate information of the second region, such that the frame image has a resolution corresponding to the resolution of the display; and displaying, on the display panel, the execution screen of each of the plurality of applications, based on the up-scaled frame image.

* * * * *